United States Patent
Luo et al.

(10) Patent No.: US 12,532,330 B2
(45) Date of Patent: Jan. 20, 2026

(54) TRANSMISSION METHOD FOR DCI CARRYING SCHEDULING INFORMATION TERMINAL, AND NETWORK SIDE DEVICE

(71) Applicant: DATANG MOBILE COMMUNICATIONS EQUIPMENT CO., LTD., Beijing (CN)

(72) Inventors: Chen Luo, Beijing (CN); Jiaqing Wang, Beijing (CN); Meiying Yang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 451 days.

(21) Appl. No.: 18/040,718

(22) PCT Filed: Jun. 17, 2021

(86) PCT No.: PCT/CN2021/100674
§ 371 (c)(1),
(2) Date: Feb. 6, 2023

(87) PCT Pub. No.: WO2022/028121
PCT Pub. Date: Feb. 10, 2022

(65) Prior Publication Data
US 2023/0292337 A1   Sep. 14, 2023

(30) Foreign Application Priority Data

Aug. 7, 2020 (CN) .......................... 202010791570.2

(51) Int. Cl.
*H04W 72/232* (2023.01)
*H04W 72/1263* (2023.01)

(52) U.S. Cl.
CPC ..... *H04W 72/232* (2023.01); *H04W 72/1263* (2013.01)

(58) Field of Classification Search
CPC ............ H04W 72/232; H04W 72/1263; H04L 5/0053
See application file for complete search history.

(56) References Cited

U.S. PATENT DOCUMENTS

2019/0132109 A1   5/2019   Zhou et al.
2019/0254110 A1   8/2019   He et al.
(Continued)

FOREIGN PATENT DOCUMENTS

CN          110519853 A      11/2019
WO       WO-2020060890 A1    3/2020
(Continued)

OTHER PUBLICATIONS

Office Action for TW application 110128405 dated Dec. 28, 2021.
(Continued)

*Primary Examiner* — Gary Mui
*Assistant Examiner* — Yewon Kim
(74) *Attorney, Agent, or Firm* — HARNESS, DICKEY & PIERCE, P.L.C.

(57) ABSTRACT

An information transmission method includes: receiving the DCI sent by a base station, wherein the DCI carries a secondary cell (SCell) dormancy indication information field; obtaining indication information for the SCell dormancy indication information field; and obtaining, according to the indication information and the SCell dormancy indication information field, an actual indication represented by the SCell dormancy indication information field for monitoring a physical downlink control channel (PDCCH).

18 Claims, 5 Drawing Sheets

(56) References Cited

U.S. PATENT DOCUMENTS

| | | | |
|---|---|---|---|
| 2021/0029772 A1* | 1/2021 | Islam | H04L 1/1896 |
| 2021/0143970 A1* | 5/2021 | Xu | H04L 1/1671 |
| 2021/0329677 A1* | 10/2021 | Huang | H04W 52/0206 |
| 2022/0360364 A1* | 11/2022 | Li | H04W 76/28 |
| 2022/0369337 A1* | 11/2022 | Wei | H04W 72/1268 |
| 2022/0408515 A1* | 12/2022 | Li | H04W 52/0216 |
| 2023/0156597 A1* | 5/2023 | Liu | H04L 5/0098 370/311 |
| 2023/0239792 A1* | 7/2023 | Xu | H04W 52/0216 370/311 |

FOREIGN PATENT DOCUMENTS

| | | | |
|---|---|---|---|
| WO | WO-2020067988 | | 4/2020 |
| WO | WO-2020068253 A2 | | 4/2020 |

OTHER PUBLICATIONS

International Search Report for International Application No. PCT/CN2021/100674 dated Sep. 10, 2021.
"Summary#4 of efficient and low latency serving cell configurationactivationsetup" 3GPP TSG-RAN WG1 #99, Reno, USA, Nov. 18-22, 2019.
"PDCCH based power saving channel design for UE power saving" 3GPP TSG RAN WG1 #99, Reno, USA, Nov. 18-22, 2019.
Ericsson, "Summary #3 of efficient and low latency serving cell configuration/activation/setup," 3GPP TSG RAN WG1 Meeting #98bis, R1-1911594, Oct. 14, 2019.
Extended Search Report issued Nov. 18, 2024 for EP application 21852464.3.

* cited by examiner

TRANSMISSION METHOD FOR DCI CARRYING SCHEDULING INFORMATION TERMINAL, AND NETWORK SIDE DEVICE

CROSS-REFERENCE TO RELATED APPLICATIONS

This application is a national phase application of International Application No. PCT/CN2021/100674, filed Jun. 17, 2021, which is based upon and claims priority to Chinese Patent Application 202010791570.2, filed Aug. 7, 2020, the entire contents of which are incorporated herein by reference.

FIELD

Embodiments of the present disclosure generally relate to the technical field of communication, and more particularly, to the technical field of wireless communication.

BACKGROUND

In recent years, the technologies related to a long term evolution (LTE) of the common mobile communication technology have developed vigorously. The LTE system may meet customer's higher requirements for wireless communication by optimizing the wireless communication technology. Therefore, how to effectively and reliably achieve power saving in the transmission process of downlink control information has become one of the important research directions.

SUMMARY

According to a first aspect of the present disclosure, an information transmission method is provided. The method is applied to a scenario where downlink control information (DCI) carries scheduling information, and includes: configuring a secondary cell (SCell) dormancy indication information field in the DCI; configuring indication information for the SCell dormancy indication information field, in which the indication information is configured to instruct a terminal to obtain an actual indication represented by the SCell dormancy indication information field for monitoring a physical downlink control channel (PDCCH); and sending the DCI and the indication information configured to the terminal.

According to a second aspect of the present disclosure, an information transmission method is provided. The method is applied to a scenario where DCI carries scheduling information, and includes: receiving the DCI sent by a base station, in which the DCI carries a SCell dormancy indication information field; obtaining indication information for the SCell dormancy indication information field; and obtaining, according to the indication information and the SCell dormancy indication information field, an actual indication represented by the SCell dormancy indication information field for monitoring a PDCCH.

According to a third aspect of the present disclosure, an information transmission method is provided. The method is applied to a scenario where DCI carries scheduling information, and includes: configuring a secondary cell (SCell) dormancy indication information field in the DCI; and sending the DCI configured to a terminal.

According to a fourth aspect of the present disclosure, an information transmission method is provided. The method is applied to a scenario where DCI carries scheduling information, and includes: configuring a secondary cell (SCell) dormancy indication information field in the DCI; sending the DCI configured to a terminal; obtaining indication information for the SCell dormancy indication information field by the terminal; and obtaining an actual indication by the terminal according to the indication information and the SCell dormancy indication information field, in which the actual indication is represented by the SCell dormancy indication information field and configured for monitoring a PDCCH.

According to a fifth aspect of the present disclosure, a terminal is provided. The terminal is applied to a scenario where DCI carries scheduling information, and includes: a memory, a transceiver, and a processor. The memory is configured to store computer programs; the transceiver is configured to send or receive data under a control of the processor, and the processor is configured to read the computer programs in the memory to: receive the DCI sent by a base station, in which the DCI carries a secondary cell (SCell) dormancy indication information field; obtain indication information for the SCell dormancy indication information field; and obtain, according to the indication information and the SCell dormancy indication information field, an actual indication that is represented by the SCell dormancy indication information field and configured for monitoring a PDCCH.

According to a sixth aspect of the present disclosure, a network side device is provided. The network side device is applied to a scenario where DCI carries scheduling information, and includes a memory, a transceiver, and a processor. The memory is configured to store computer programs; the transceiver is configured to send or receive data under a control of the processor; and the processor is configured to read the computer programs in the memory to: configure a SCell dormancy indication information field in the DCI; configure indication information for the SCell dormancy indication information field, in which the indication information is configured to instruct a terminal to obtain an actual indication represented by the SCell dormancy indication information field for monitoring a physical downlink control channel (PDCCH); and send the DCI and the indication information configured to the terminal.

According to a seventh aspect of the present disclosure, a network side device is provided. The network side device is applied to a scenario where DCI carries scheduling information, and includes: a memory, a transceiver, and a processor. The memory is configured to store computer programs; the transceiver is configured to send and receive data under control of the processor; and the processor is configured to read the computer programs in the memory to: configure a SCell dormancy indication information field in the DCI; send the DCI configured to a terminal. The SCell dormancy indication information field represents an actual indication for monitoring a PDCCH, and the actual indication is determined by the terminal according to indication information.

According to an eighth aspect of the present disclosure, an information transmission system is provided. The information transmission system is applied to a scenario where DCI carries scheduling information, and includes a base station and a terminal. The base station is configured to configure a secondary cell (SCell) dormancy indication information field in the DCI and send the DCI configured to the terminal. The terminal is configured to obtain indication information for the SCell dormancy indication information field; and obtain, according to the indication information and the SCell dormancy indication information field, an actual indication represented by the SCell dormancy indication information field for monitoring a PDCCH.

According to a ninth aspect of the present disclosure, a processor-readable storage medium is provided. The processor-readable storage medium has stored therein computer programs that, when executed by a processor, cause the processor to perform the information transmission method according to the first aspect, the second aspect, or the third aspect of the present disclosure.

It is understood that what is described here is not intended to identify key or important features of embodiments of the present disclosure, nor is it intended to limit the scope of the present disclosure. Other features of the present disclosure will be easily understood from the following description.

BRIEF DESCRIPTION OF THE DRAWINGS

The accompanying drawings are used to easily understand the present disclosure, and do not limit the present disclosure, in which.

DETAILED DESCRIPTION

The term "and/or" used in embodiments of the present disclosure describes an association relationship of associated objects, which indicates three relationships. For example, A and/or B covers threes cases where A exists alone, A and B exist simultaneously, and B exists alone. The character "/" generally indicates that the contextual objects are in an "or" relationship.

The term "a plurality of" in embodiments of the present disclosure refers to two or more, and other quantifiers are similar thereto.

The technical solutions in embodiments of the present disclosure will be clearly and completely described below with reference to the accompanying drawings in embodiments of the present disclosure. Apparently, the embodiments described herein are only some embodiments of the present disclosure, rather than all embodiments. All other embodiments obtained by those skilled in the art based on the embodiments described in the present disclosure without creative efforts belong to the protection scope of the present disclosure.

Figure 1:
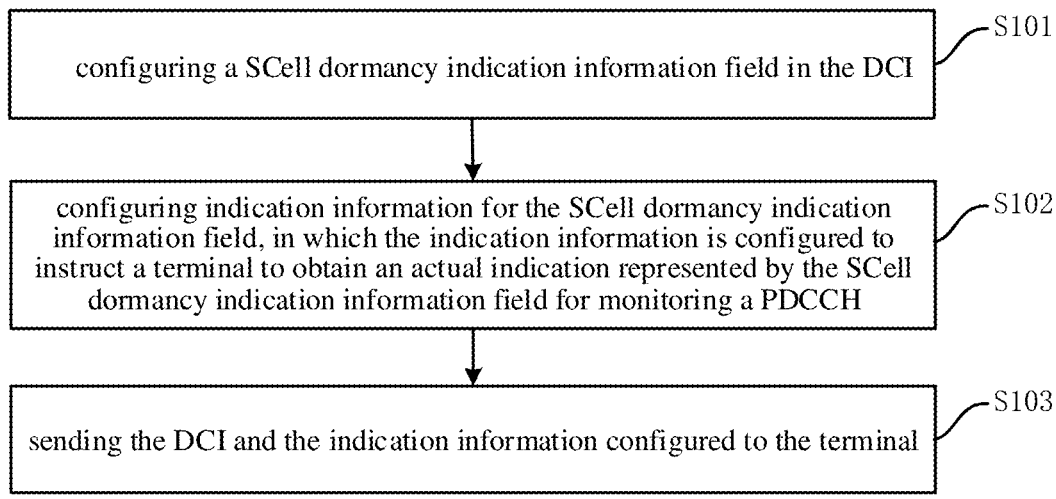
FIG. 1 is a schematic diagram according to an embodiment of the present disclosure.

FIG. 1 is a schematic diagram according to a first embodiment of the present disclosure. As shown in FIG. 1, an information transmission method according to embodiments of the present disclosure will be described and explained with a base station being used as an execution subject. The method includes the following step S101 to step S103.

In step S101, a secondary Cell (SCell) dormancy indication information field in downlink control information (DCI) is configured.

The downlink control information (DCI) refers to downlink control information that is carried by a physical downlink control channel (PDCCH) and sent by the base station (such as an evolutional Node B, eNB for short) to a user equipment (UE) like a terminal.

The secondary cell (SCell) refers to a cell working on a secondary frequency band. Generally, a SCell group may include one or more SCells. The SCell dormancy indication information field may be used to indicate the SCell group, and may also be used to indicate a single SCell in the SCell group.

It is noted that the DCI may include a plurality of information fields, such as a carrier indicator field (CIF), a frequency domain resource allocation information field (such as a physical resource block, PRB), a modulation and coding scheme (MCS) information field, a hybrid automatic repeat request (HARQ) information field, an identity document (ID) information field, and the like.

Different DCI information has different purposes. For example, DCI for carrier scheduling, DCI for adjusting uplink power control, and DCI for downlink dual-current spatial division multiplexing may be configured. In applications, DCI for different purposes may be distinguished by lengths of different formats (DCI formats). In embodiments of the present disclosure, the information transmission is applied to a scenario where DCI carries scheduling information. The DCI carrying the scheduling information may include DCI formats such as 0_1 and/or 1_1.

The base station may allocate one or more search spaces to a user, a configuration of each search space is periodic, and the user performs PDCCH detection in the configured search space. A moment when the user performs the PDCCH detection is called a PDCCH monitoring occasion. The search space is generally configured periodically. In a 5th generation new radio (5G NR) system, in order to obtain downlink scheduling information, the UE needs to monitor the PDCCH at each PDCCH monitoring occasion to determine whether there is downlink scheduling information.

In order to enable the terminal to monitor the PDCCH, 0 to 5 bits are added in the DCI as the SCell dormancy indication information field. Through the added SCell dormancy indication information field, the base station may configure the SCell dormancy indication information field, to instruct the terminal to monitor the PDCCH to obtain the downlink scheduling information.

When the SCell dormancy indication information field in the DCI is to be configured, the number of SCell groups may be configured in a radio resource control (RRC) parameter, and a bit length of S Cell group dormancy indication information may be determined according to the number to configure the SCell dormancy indication information field in the DCI.

In step S102, indication information for the SCell dormancy indication information field is configured. The indication information is configured to instruct a terminal to obtain an actual indication represented by the SCell dormancy indication information field for monitoring a physical downlink control channel (PDCCH).

In step S103, the DCI and the indication information configured are sent to the terminal.

The indication information for the SCell dormancy indication information field may be configured in various ways. For example, the indication information may be configured by assigning a value to a specific information field in the SCell dormancy indication information field. For example, the indication information may be configured through a target parameter. For example, configuration information of high-layer parameters may be obtained, and the indication information may be configured according to the configuration information.

Optionally, after the base station completes the configuration of the SCell dormancy indication information field in the DCI and the configuration of the indication information for the SCell dormancy indication information field, the DCI and the indication information configured may be sent to the terminal.

In embodiments of the present disclosure, the indication information may be introduced, and the SCell dormancy indication information field may be defined with various definitions through the indication information. Therefore, the terminal may interpret the SCell dormancy indication information field according to the indication information to obtain the actual indication, so as to configure the terminal for monitoring the PDCCH.

According to the information transmission method in embodiments of the present disclosure, information transmission may be achieved by configuring the SCell dormancy indication information field in the DCI and the indication information for the SCell dormancy indication information field by the base station, and sending the DCI and the indication information configured to the terminal by the base station. In this way, embodiments of the present disclosure can use the base station to configure the SCell dormancy indication information field in the DCI and the indication information, and send the DCI and the indication information configured to the terminal, such that the terminal can interpret the representation results of the SCell dormancy indication information field according to different values of the indication information, and dynamically adjust a monitoring behavior of the terminal to the PDCCH according to the representation results. In this way, the monitoring behavior on the PDCCH has better adaptive ability, which may effectively solve a power consumption problem of continuous monitoring the PDCCH in fixed configuration, so that the terminal may achieve the effect of power saving.

It is noted that in the present disclosure, different actual indications represented by the dormancy indication information field may be interpreted according to different values of the indication information.

On the basis of the above-mentioned embodiments, different indications represented by the dormancy indication information field are interpreted according to different values of the indication information. In an embodiment, if the indication information is a first value, the SCell dormancy indication information field represents an indication of dormancy of the SCell or the SCell group.

In embodiments of the present disclosure, the representation result of the SCell dormancy indication information field may be interpreted according to different values of the indication information. If the indication information is the first value, the SCell dormancy indication information field represents an indication of whether the SCell or the SCell group is dormant. That is to say, when the indication information is the first value, the SCell dormancy indication information field only indicates to monitor the dormancy of the SCell or the SCell group.

The first value may be set according to different indication information configuration ways. For example, the first value may be set as 0.

In an embodiment, if the indication information is a second value, the SCell dormancy indication information field represents one of the following indications: a joint indication of dormancy and/or adaptation of a primary cell (PCell) and dormancy and/or adaptation of the SCell or the SCell group; an indication of dormancy and/or adaptation of the PCell; or an indication for configuring the SCell dormancy indication information field as default information bits.

The primary cell (PCell) refers to a cell working on a main frequency band.

The second value may be set according to different indication information configuration ways. For example, the second value may be set as 1.

In a first case, when the indication information is the second value, and the SCell dormancy indication information field represents the joint indication of the dormancy and/or the adaptation of the PCell and the dormancy and/or the adaptation of the SCell or the SCell group, the indication represented by the SCell dormancy indication information field may include: an indication of the dormancy of the PCell and the dormancy of the SCell or the SCell group; an indication of the adaptation of the PCell and the dormancy of the SCell or the SCell group; an indication of the dormancy of the PCell and the adaptation of the SCell or the SCell group; an indication of the adaptation of the PCell and adaptation of the SCell or the SCell group; a joint indication of the dormancy and/or the adaptation of the PCell and the dormancy and/or the adaptation of the SCell or the SCell group, or any combination thereof.

For the indication of the dormancy of the PCell and the dormancy of the SCell or the SCell group, the indication of the dormancy of the PCell is whether the PCell is in a dormant state. The indication of the dormancy of the SCell or the SCell group is in a form of a bitmap, that is, each bit indicates a dormancy behavior of a SCell group. For example, the indication of the dormancy of the PCell is 1 bit, and the indication of the dormancy of the SCell group is K bits, which respectively correspond to K2 SCell groups configured by a high-layer signaling.

For example, when the value of the indication information is 0, the indication of the dormancy of the PCell and/or the indication of the dormancy of the SCell or the SCell group instruct corresponding PCell and/or SCell or SCell group to enter dormant states, that is, does not perform PDCCH monitoring. The present disclosure does not limit the method of entering the dormant state. For example, entering the dormant state may be skipping PDCCH monitoring, switching a bandwidth part (BWP) to a BWP without PDCCH configuration, pre-configuring PDCCH monitoring information based on a high-layer signaling, and the like.

For the indication of the adaptation of the PCell and the dormancy of the SCell or the SCell group, the indication of the adaptation of the PCell is whether the PCell is in a PDCCH monitoring adaptive state. The indication of the dormancy of the SCell (group) is in a form of a bitmap, that is, each bit indicates a dormancy behavior of a SCell (group). For example, the indication of the adaptation of the PCell is K1 bits, and the indication of the dormancy of the SCell is K2 bits, which respectively correspond to K2 SCell groups configured by a high-layer signaling. Both K1 and K2 are integers greater than or equal to zero.

Optionally, when K1=1 bit, whether to enable the PCell to monitor the PDCCH adaptively may be further identified according to different values of the indication information. Optionally, when PCell adaptation indication information is a first value, the terminal is instructed to performing monitoring according to the parameter configuration of the current PDCCH. When PCell adaptation indication information is a second value, the terminal is instructed to performing monitoring according to the parameter configuration of the pre-configured candidate PDCCH.

Optionally, when K1=2 bits, whether to enable one or several functions of the PCell to adaptively monitor the PDCCH may be further identified according to different values of the indication information. K1 may be determined according to the number of functional domains or different index values configured by a high-layer layer. For example, when K1 is "11", it is determined to indicate that two functions, i.e., a monitoring cycle and an aggregation level (AL), are adaptively changed. That is, a monitoring cycle 1 is adaptive to a monitoring cycle 2, and an aggregation level set 1 is adaptive to an aggregation level set 2.

For the indication of the adaptation of the PCell and the adaptation the SCell or the SCell group, the indication of the adaptation of the PCell is whether the PCell is in the PDCCH monitoring adaptive state, and the indication of the adaptation of the SCell group is in a form of a bitmap, that is, each bit indicates an adaptation behavior of a SCell group. When SCell adaptation indication information is a first value, the terminal is instructed to performing monitoring according to the parameter configuration of the current PDCCH. When SCell or SCell group adaptation indication information is a second value, the terminal is instructed to performing monitoring according to the parameter configuration of the pre-configured candidate PDCCH. For the description of the indication of the adaptation of the PCell, reference may be made to the above-mentioned related contents, which will not be repeated here.

For the joint indication of the dormancy and/or the adaptation of the PCell and the dormancy and/or the adaptation of the SCell or the SCell group, in an embodiment, a value corresponding to the SCell dormancy indication information field may be used as the joint indication, and a monitoring behavior of the PCell and the SCell or the SCell group may be decoded according to the value. After the DCI is received by the terminal, the terminal may obtain the Scell dormancy indication information field. The terminal uses the value corresponding to the Scell dormancy indication information field as the joint indication, and decode the value to obtain the monitoring behavior of the PCell and the SCell or the SCell group based on a decoding result. It is noted that a relationship between the decoding result and the monitoring behavior of the PCell and the SCell or the SCell group may be sent to the terminal in advance.

In an embodiment, a sixth high-layer signaling may be sent to the terminal, and the sixth high-layer signaling carries a mapping relationship between the joint indication and the monitoring behavior of the PCell and the SCell or the SCell group. After the SCell dormancy indication information field is obtained by the terminal, the terminal may use the joint indication corresponding to the SCell dormancy indication information field as an index value. The joint indication may be essentially a value of the Scell dormancy indication information field, and the value may be encoding information. The terminal may obtain the monitoring behavior of the PCell and the SCell or the SCell group by indexing the mapping relationship using the index value. Each index value corresponds to one or a combination of the monitoring behaviors under the joint indication of the dormancy and/or the adaption of the PCell and/or the SCell or the SCell group, such as, the indication of the dormancy of the PCell and the dormancy of the SCell or the SCell group; the indication of the adaptation of the PCell and the dormancy of the SCell or the SCell group; the indication of the dormancy of the PCell and the adaptation of the SCell or the SCell group; the indication of the adaptation of the PCell and the adaptation of the SCell or the SCell group; and the joint indication of the dormancy and/or the adaptation of the PCell and the dormancy and/or the adaptation of the SCell or the SCell group.

In a second case, when the indication information is the second value, the SCell dormancy indication information field may also represent the indication of dormancy and/or adaptation of the PCell. The monitoring indication of the dormancy and/or the adaptation of the PCell includes: an indication of dormancy of the PCell, an indication of adaptation of the PCell, and an indication including both the dormancy of the PCell and the adaptation of the PCell. Different values of the SCell dormancy indication information field may configure different monitoring modes or ways for the PCell.

If the SCell dormancy indication information field represents the indication of the adaptation of the PCell, a third high-layer signaling is sent to the terminal, and the third high-layer signaling is configured to instruct the terminal to configure the adaptation behavior of the PCell. The adaptation behavior of the PCell includes performing monitoring according to candidate values of one or more parameters in a parameter set configured for PDCCH monitoring. The candidate values are a subset of values in a value set configured for the one or more parameters, or values different from those in the value set.

Optionally, the indication way may be any one of an overall switch type (i.e., one bit) or an adaptive function indication (i.e., more than one bits).

If the SCell dormancy indication information field represents the indication of dormancy of the PCell, a fourth high-layer signaling is sent to the terminal, and the fourth high-layer signaling is configured to instruct the terminal to configure a dormancy behavior of the PCell. The dormancy behavior of the PCell includes skipping one or more PDCCH monitoring occasions.

If the SCell dormancy indication information field represents the indication of the dormancy and the adaptation of the PCell, a fifth high-layer signaling is sent to the terminal, and the fifth high-layer signaling is configured to instruct the terminal to configure the joint monitoring behavior of the PCell including the dormancy behavior and the adaptation behavior. The joint monitoring behavior includes skipping one or more PDCCH monitoring occasions, and performing adaptation adjustment on one or more parameters in a parameter set configured for the PDCCH monitoring.

For the case where the SCell dormancy indication information field is 1 bit, and the case where the SCell dormancy indication information field is N bits, in which N is an integer greater than 1, the indication of the dormancy and/or the adaptation of the PCell will be described respectively as follows.

For the case where the SCell dormancy indication information field is 1 bit, and the SCell dormancy indication information field represents the indication of the dormancy and/or the adaptation of the PCell, illustrations are made as follows.

In embodiments of the present disclosure, if the SCell dormancy indication information field represents the indication of the dormancy of the Pcell, a fourth high-layer signaling is sent to the terminal. The fourth high-layer signaling is configured to instruct the terminal to configure a dormancy behavior of the PCell, and the dormancy behavior of the PCell includes skipping one or more PDCCH monitoring occasions.

Optionally, the SCell dormancy indication information field is 1 bit, and the SCell dormancy indication information field represents the indication of the dormancy of the PCell, which may indicate whether to skip the PDCCH monitoring at subsequent one or more PDCCH monitoring occasions. If the indication information is a first value, the subsequent one or more PDCCH monitoring occasions are not skipped. If the indication information is a second value, the subsequent one or more PDCCH monitoring occasions are skipped. The number of the PDCCH monitoring occasions to be skipped may be an explicit notification (that is, the number of the PDCCH monitoring occasions to be skipped is declared beforehand), or an implicit notification (that is, the number of the PDCCH monitoring occasions to be skipped is not declared beforehand).

Optionally, the SCell dormancy indication information field may indicate whether to switch from a first parameter configuration of the PDCCH monitoring to a second parameter configuration. The first parameter configuration and the second parameter configuration are not limited to configuration on one parameter, and may be configuration on one or more of the following parameters: a monitoring cycle, a monitoring pattern, and blind detection times in the PDCCH monitoring configuration. The change of the parameter configuration may be an explicit notification (that is, the change of the parameter configuration is declared beforehand), or an implicit notification (that is, the change of the parameter configuration is not declared beforehand).

Optionally, the SCell dormancy indication information field may indicate whether to change discontinuous reception (DRX) parameter configuration. The change of the parameter configuration may be an explicit notification or an implicit notification.

Optionally, the SCell dormancy indication information field may indicate whether to receive a power saving signal during a DRX inactive period.

Optionally, the SCell dormancy indication information field may indicate changes in parameters such as the number/layer number of sending/receiving antennas, activated band width part (BWP), the number of data transmission layers, and a single side band (SSB) cycle. The parameters may be configured in an explicit way (that is, the parameter configuration is declared beforehand), or in an implicit way (that is, the parameter configuration is not declared beforehand).

For the case where the SCell dormancy indication information field is N bits, and the SCell dormancy indication information field represents the indication of the dormancy and/or the adaptation of the PCell, illustrations are made as follows.

Optionally, the indication may indicate a specific value of a certain parameter in the PDCCH monitoring related parameter configuration.

Optionally, the indication of the dormancy and/or the adaptation of the PCell may be a combination indication of several parameters in the PDCCH monitoring related parameter configuration, such as a combination indication of a monitoring cycle, a monitoring pattern, blind detection times and other parameters in the PDCCH monitoring configuration. The joint indication is performed through a bitmap indication, the value indicates one or more combinations, and a specific combination form is not limited to the above-mentioned example.

Optionally, the indication of the dormancy and/or the adaptation of the PCell may be a joint indication of PDCCH monitoring skipping and parameter configuration. The joint indication is performed through a bitmap indication, the value indicates one or more combinations, and a specific combination form is not limited to the above-mentioned example.

Optionally, the indication of the dormancy and/or the adaptation of the PCell may indicate one or a combination of parameters such as DRX parameter configuration, power-saving signal reception, the number/layer number of transmitting/receiving antennas, activated BWP, the number of data transmission layers, and SSB cycle. It is noted that the candidate values of the above-mentioned parameters are a subset of values in the value set configured, or values different from those in the value set. Optionally, the joint indication may be performed through a bitmap indication, the value indicates one or more combinations, and the specific combination form is not limited to the above-mentioned example.

Figure 2:
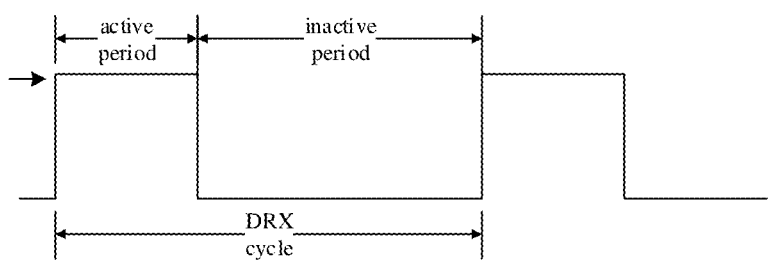
FIG. 2 is a schematic diagram showing a discontinuous reception (DRX) working mechanism.

In the related art, as shown in FIG. 2, in a DRX cycle, the UE only monitors the PDCCH during a DRX active period, and the UE does not receive other PDCCHs except a scheduling broadcast signaling during a DRX inactive period (also called opportunity for DRX), i.e., DRX Off.

During the DRX inactive period, the base station will send the DCI to the terminal to indicate whether to perform PDCCH monitoring in a next long DRX cycle. During the DRX active period, the SCell dormancy indication information field is introduced to instruct the SCell or the SCell group to dorm based on the DCI.

It could be seen that the following defects exist in the related art. It is only possible to limit whether the PCell performs the PDCCH monitoring in a next cycle. During the DRX active period, only the indication of the dormancy of the SCell or the SCell group can be performed, and there is no indication of other behaviors of the PDCCH monitoring of the PCell. When trying to modify the indication of the dormancy, its achievement requires a RRC reconfiguration process, which is generally used for semi-static configuration and has poor flexibility. The DRX active period is related to the DRX cycle and an inactivation timer (related to a data arrival time), when there is no business arrival to the PCell or the data service has delay-insensitive characteristics, the terminal continues the monitoring during the DRX active period, which will cause the terminal to consume unnecessary power. The DCI format is generally for the local carrier scheduling DCI format, such that the corresponding SCell dormancy indication information field cannot be used in case of cross-carrier scheduling.

Compared with the related art, embodiments of the present disclosure can dynamically adjust the monitoring behavior of the terminal to the PDCCH according to the representation results, rather than continuous monitoring, thereby effectively solving the power consumption problem of continuous monitoring on the PDCCH in fixed configurations. At the same time, the corresponding parameters may be flexibly configured to make the monitoring behavior on the PDCCH more adaptive.

In a third case, when the indication information is the second value, the SCell dormancy indication information field may represent the indication for configuring the SCell dormancy indication information field as default information bits. In this case, the SCell group dormancy information field may be used for auxiliary decoding. In this way, the information transmission method in the present disclosure may use an idle information field in the DCI format as known information, and provide the known information for a decoding process of the terminal, thereby improving the decoding performance.

According to the information transmission method in embodiments of the present disclosure, the representation result of the SCell dormancy indication information field may be interpreted by determining the indication information as the first value or the second value. Therefore, the information transmission method of the present disclosure may interpret the representation result of the SCell dormancy indication information field only based on the different values of the indication information without changing the size of the DCI format, and dynamically adjust the monitoring behavior of the terminal to the PDCCH. In this way, the monitoring behavior on the PDCCH has good adaptive ability, which may effectively solve the power consumption problem of continuous monitoring on the PDCCH in fixed configurations, so that the terminal may achieve the effect of power saving.

Further, when the indication information is the second value, and the SCell dormancy indication information field represents the indication of the adaptation of the PCell, a third high-layer signaling is sent to the terminal, and the third high-layer signaling is configured to instruct the terminal to configure an adaptation behavior of the PCell. The adaptation behavior of the PCell includes performing monitoring according to candidate values of one or more parameters in a parameter set configured for the PDCCH monitoring. The candidate values are a subset of values in a value set configured for the one or more parameters, or values different from those in the value set.

In the following, the indication information for the SCell dormancy indication information field is described as follows.

In the present disclosure, when trying to configure the indication information for the SCell dormancy indication information field, the indication information may be configured according to a target information field, a target parameter or configuration information of high-layer parameters.

In an embodiment, the target information field in the DCI may be assigned a value, and the target information field assigned is configured as the indication information. The indication information is carried in the DCI and sent to the terminal.

Figure 3:
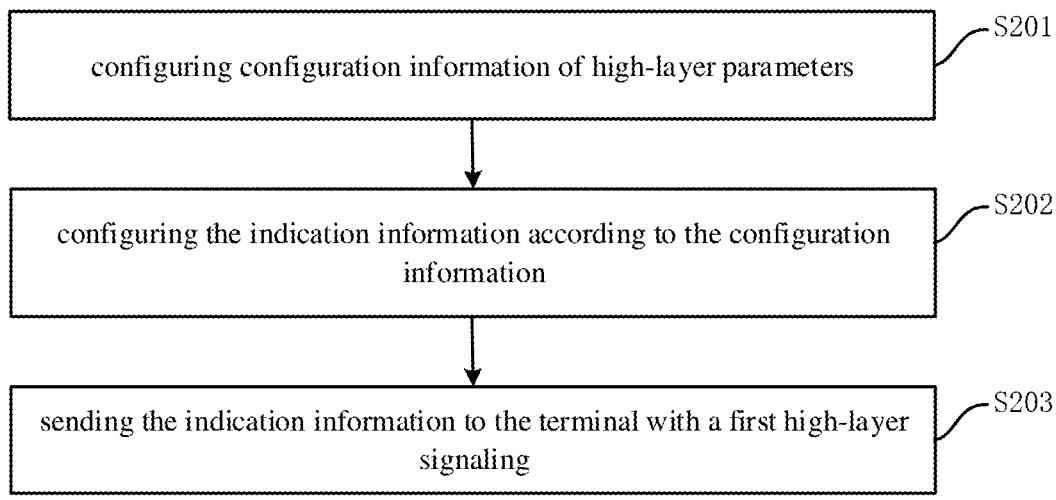
FIG. 3 is a schematic diagram according to an embodiment of the present disclosure.

As shown in FIG. 3, the above-mentioned process of configuring the indication information according to the target information field includes the following steps S201 to S203.

In step S201, configuration information of high-layer parameters is configured.

In step S202, the indication information is configured according to the configuration information.

In step S203, the indication information is sent to the terminal with a first high-layer signaling.

It is noted that the target information field at least includes a carrier indicator field. Optionally, the base station may assign a value to the carrier indicator field in the DCI, and configure the carrier indicator field assigned as the indication information.

Further, the terminal may interpret the representation result of the SCell dormancy indication information field according to the assignment of the carrier indicator field. If the assignment of the carrier indicator field is zero or the carrier indicator field is zero bit, the SCell dormancy indication information field represents a monitoring indication of the dormancy of the SCell group. If the assignment of the carrier indicator field is non-zero, the SCell dormancy indication information field represents one of the following instructions: the joint monitoring indication of the dormancy and/or the adaptation of the PCell and the dormancy and/or the adaptation of the SCell group, the monitoring indication of the dormancy and/or the adaptation of the PCell, or the indication for configuring the SCell dormancy indication information field as default information bits.

It is noted that in a case where the SCell dormancy indication information field represents the monitoring indication for configuring the SCell dormancy indication information field as the default information bits, and the base station configures the SCell group for the terminal, the base station may configure the SCell dormancy indication information field of the SCell group as a default value, such as, all 0, all 1 or a certain fixed value, and the SCell dormancy indication information field may be used as auxiliary decoding information in the terminal, which may provide known information for the decoding process, thereby improving the decoding performance.

In an embodiment, the target parameter sent by the terminal may be received. The target parameter includes at least one selected from a version parameter of the terminal and a capability parameter of the terminal.

Figure 4:
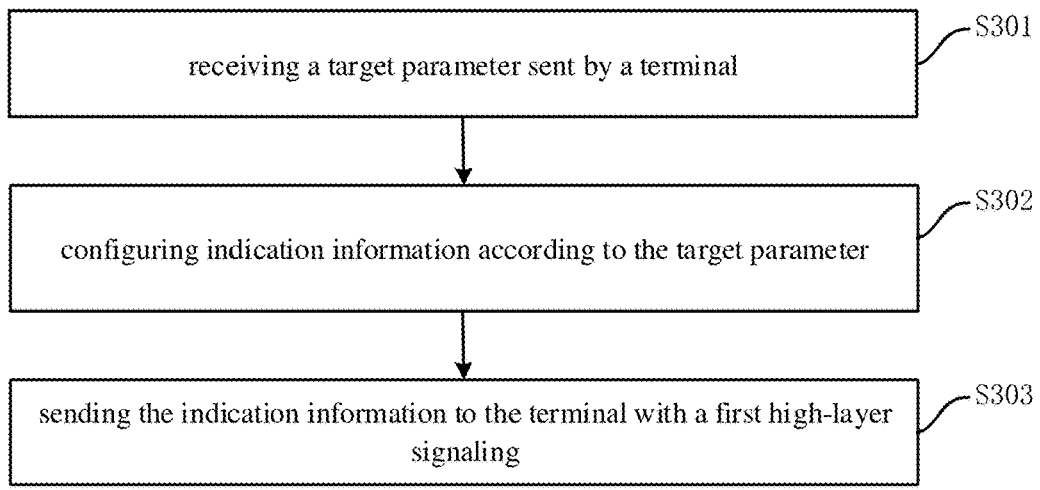
FIG. 4 is a schematic diagram according to an embodiment of the present disclosure.

As shown in FIG. 4, the above-mentioned process of configuring the indication information according to the target parameter includes the following steps S301 to S303.

In step S301, a target parameter sent by a terminal is received.

In step S302, indication information is configured according to the target parameter.

In step S303, the indication information is sent to the terminal with a first high-layer signaling.

For example, the target parameter received from the terminal includes the version parameter of the terminal which indicates the terminal is a Rel-17 terminal, and the capability parameters of the terminal including a terminal network capability and a terminal wireless access capability. The indication information may be configured according to the Rel-17 terminal, the terminal network capability and the terminal wireless access capability, and is sent to the terminal with the first high-layer signaling.

In an embodiment, the configuration information of the high-layer parameters may be obtained, the indication information is configured according to the configuration information, and the indication information is sent to the terminal with the first high-layer signaling.

Figure 5:
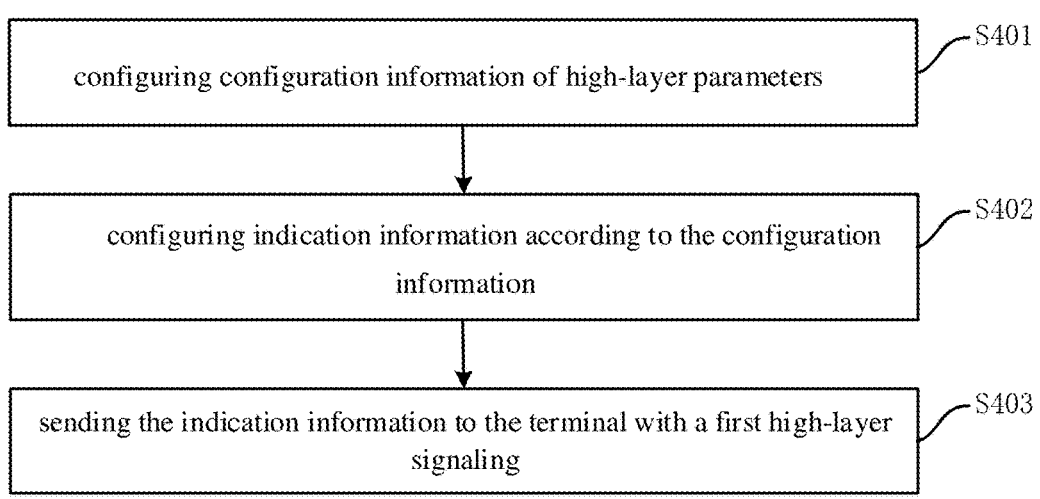
FIG. 5 is a schematic diagram according to an embodiment of the present disclosure.

As shown in FIG. 5, the above-mentioned process of configuring the indication information according to the configuration information of the high-layer parameters includes the following steps S401 to S403.

In step S401, the configuration information of the high-layer parameters is configured.

In step S402, the indication information is configured according to the configuration information.

In step S403, the indication information is sent to the terminal with the first high-layer signaling.

For example, the configuration information of the high-layer parameter obtained is "on/off" information when the value of the indication information is zero or non-zero. The indication information may be configured according to the configuration information, and sent to the terminal with the first high-layer signaling.

In the present disclosure, different generation ways of the indication information are provided. The indication information may be carried in the target information field of the DCI to save resources, or the indication information may be represented through some target parameters or high-layer parameters without separate definition.

It is noted that since the method of the present disclosure is applied to the scenario where the DCI carries the scheduling information, the base station may configure the SCell dormancy indication information field in the DCI. Therefore, after the DCI and the indication information configured are sent to the terminal, an information field size of the SCell dormancy indication information field may be obtained implicitly or explicitly, so as to interpret the SCell dormancy indication information field according to the information field size, to obtain an accurate actual indication.

Optionally, on the basis of the above-mentioned embodiments, after sending the DCI and the indication information configured to the terminal in the above-mentioned step S103, a second high-layer signaling may be sent to the terminal, and the second high-layer signaling carries the information field size of the SCell dormancy indication information field.

It is noted that, after the DCI and the indication information configured are sent to the terminal, the second high-layer signaling may be sent to the terminal. The second high-layer signaling carries the information field size of the SCell dormancy indication information field.

Further, after the DCI and the indication information configured are sent to the terminal, if the SCell dormancy indication information field represents the indication of the adaptation of the PCell, a third high-layer signaling is sent to the terminal, and the third high-layer signaling is configured to instruct the terminal to configure the adaptation behavior of the PCell. The adaptation behavior of the PCell includes performing monitoring according to candidate values of one or more parameters in a parameter set configured for the PDCCH monitoring. The candidate values are a subset of values in a value set configured for the one or more parameters, or values different from those in the value set.

If the SCell dormancy indication information field represents the indication of whether the PCell is dormant, a fourth high-layer signaling is sent to the terminal. The fourth high-layer signaling is configured to instruct the terminal to configure a dormancy behavior of the PCell. The dormancy behavior of the PCell includes suspending monitoring on the PDCCH at one or more PDCCH monitoring occasions.

If the SCell dormancy indication information field represents the indication of the dormancy and the adaptation of the PCell, a fifth high-layer signaling is sent to the terminal. The fifth high-layer signaling is configured to instruct the terminal to configure a joint monitoring behavior of the PCell including a dormancy behavior and an adaptation behavior. The joint monitoring behavior includes skipping one or more PDCCH monitoring occasions, and performing adaptation adjustment on one or more parameters in a parameter set configured for the PDCCH monitoring.

It is noted that the SCell dormancy indication information field represents a joint monitoring indication of the dormancy and/or the adaptation of the PCell and the dormancy and/or the adaptation of the SCell group, and the joint indication corresponding to the SCell dormancy indication information field is used as an index value. That is to say, the value corresponding to the SCell dormancy indication information field is used as the index value, and the value may be encoding information. Based on the index value, the terminal may index the monitoring behavior of the PCell and the SCell or the SCell group. Correspondingly, after the base station sends the DCI and the indication information configured to the terminal, the base station may send a sixth high-layer signaling to the terminal. The sixth high-layer signaling carries a mapping relationship between the index value and the monitoring behavior of the PCell and the SCell or the SCell group. Correspondingly, by indexing the mapping relationship according to the index value, the terminal may obtain the monitoring behavior of the PCell and the SCell or the SCell group.

Figure 6:
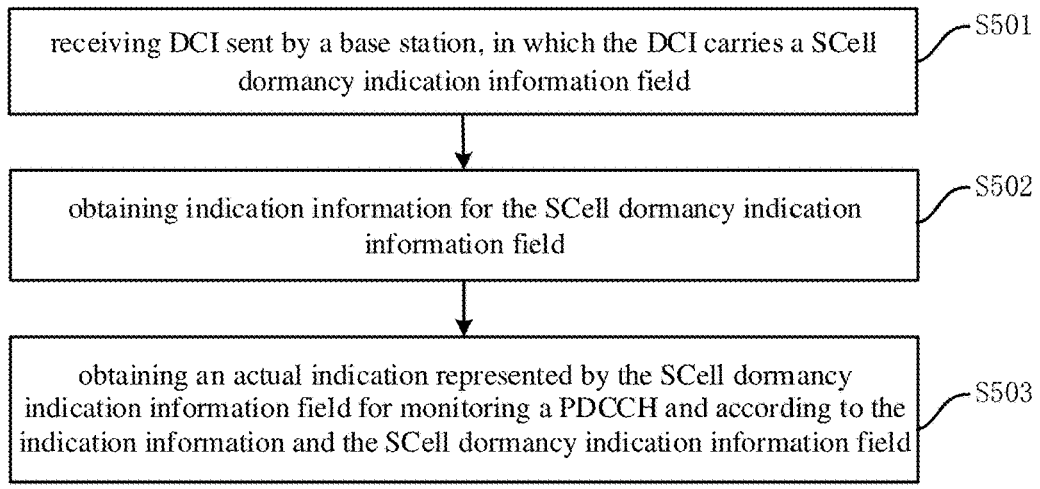
FIG. 6 is a schematic diagram according to an embodiment of the present disclosure.

FIG. 6 is a schematic diagram according to a fifth embodiment of the present disclosure. As shown in FIG. 6, an information transmission method in embodiments of the present disclosure is described and explained with a terminal being used as an execution subject, and the information transmission method includes the following steps S501 to S503.

In step S501, DCI sent by a base station is received. The DCI carries a SCell dormancy indication information field.

Optionally, after the base station completes the configuration of the SCell dormancy indication information field in the DCI and sends the SCell dormancy indication information field in the DCI to the terminal, the terminal may receive the DCI sent by the base station, and the DCI carries the SCell dormancy indication information field.

In step S502, indication information for the SCell dormancy indication information field is obtained.

Optionally, after the base station completes the configuration of the indication information for the SCell dormancy indication information field and sends the configured indication information for the SCell dormancy indication information field to the terminal, the terminal may receive the indication information sent by the base station.

It is noted that, in the present disclosure, when the base station attempts to send the DCI and indication information, the above-mentioned data may be sent synchronously or asynchronously. Correspondingly, the terminal may receive the DCI and the indication information sent by the base station synchronously, or receive the DCI and the indication information asynchronously.

In step S503, an actual indication represented by the SCell dormancy indication information field for monitoring a PDCCH is obtained according to the indication information and the SCell dormancy indication information field.

Optionally, after the terminal receives the DCI and indication information, the terminal may decode the SCell dormancy indication information field through PDCCH blind detection according to the indication information, so as to obtain the actual indication represented by the SCell dormancy indication information field for monitoring the PDCCH.

It is noted that, in order to avoid fault detection during the PDCCH blind detection process, after the decoding is completed, DCI decoding information and DCI format information corresponding to the DCI decoding information may be cached and checked through a cyclic redundancy check (CRC) to determine whether a result obtained by the PDCCH blind detection is correct.

According to the information transmission method in embodiments of the present disclosure, the DCI and the indication information for the SCell dormancy indication information field sent by the base station are received, and the SCell dormancy indication information field is decoded according to the indication information, so as to obtain the actual indication for monitoring the PDCCH and represented by the SCell dormancy indication information field. In this way, the information transmission method of the present disclosure may receive and decode the DCI and the indication information for the SCell dormancy indication information field sent by the base station, so as to interpret the actual indication represented by the SCell dormancy indication information field for monitoring the PDCCH, so that the terminal may interpret the representation results of the SCell dormancy indication information field based on different values of the indication information, and dynamically adjust the monitoring behavior of the terminal to the PDCCH according to the representation results, so as to achieve the effect of power saving.

It is noted that, in the present disclosure, the terminal may decode the SCell dormancy indication information field to interpret different monitoring indications represented by the dormancy indication information field.

Figure 7:
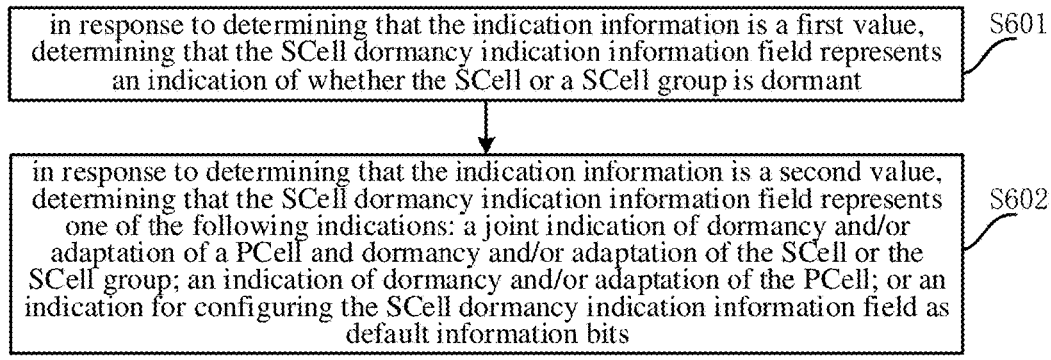
FIG. 7 is a schematic diagram according to an embodiment of the present disclosure.

In an embodiment, as shown in FIG. 7, on the basis of the above-mentioned embodiments, the process as described in the above-mentioned step S503 of obtaining the actual indication represented by the SCell dormancy indication information field for monitoring the PDCCH according to the indication information and the SCell dormancy indication information field includes the following steps S601 to S602.

In step S601, in response to determining that the indication information is a first value, the SCell dormancy indication information field represents an indication of whether the SCell or the SCell group is dormant.

In embodiments of the present disclosure, the representation result of the SCell dormancy indication information field may be interpreted by decoding the SCell dormancy indication information field. When it is determined that the indication information is the first value, the SCell dormancy indication information field represents the indication of whether the SCell or the SCell group is dormant. That is to say, when it is determined that the indication information is the first value, decoded information of the SCell dormancy indication information field only represents performing monitoring the dormancy of the SCell or the SCell group.

In step S602, in response to determining that the indication information is a second value, the SCell dormancy indication information field represents one of the following indications: a joint indication of dormancy and/or adaptation of a PCell and dormancy and/or adaptation of the SCell or the SCell group; an indication of dormancy and/or adaptation of the PCell; or an indication for configuring the SCell dormancy indication information field as default information bits.

In embodiments of the present disclosure, when it is determined that the indication information is the second value, the SCell dormancy indication information field represents one of the following indications: the joint indication of the dormancy and/or the adaptation of the PCell and the dormancy and/or the adaptation of the SCell or the SCell group; the indication of the dormancy and/or the adaptation of the PCell; or the indication for configuring the SCell dormancy indication information field as the default information bits.

It is noted that when the indication information is the second value, the specific introduction on the content represented by the SCell dormancy indication information field may refer to the descriptions on the relevant contents in the above-mentioned embodiments, and will not be repeated here. In embodiments of the present disclosure, when trying to obtain the indication information for the SCell dormancy indication information field, the signaling carrying the indication information may be received from the base station. Optionally, the signaling is the DCI, and a target information field in the DCI is configured to carry the indication information. Optionally, the signaling is a first high-layer signaling, and the indication information is configured according to configuration information of high-layer parameters.

It is noted that, the specific introduction of the contents on the PDCCH monitoring of the dormancy and/or the adaptation of the PCell may refer to the descriptions on the related content in the above-mentioned embodiments, and will not be repeated here.

According to the information transmission method in embodiments of the present disclosure, the SCell dormancy indication information field may be decoded by determining that the indication information is the first value or the second value, so as to interpret the representation result of the SCell dormancy indication information field. Optionally, when it is determined that the indication information is the first value, the SCell dormancy indication information field represents the indication of whether the SCell or the SCell group is dormant. Optionally, when it is determined that the indication information is the second value, the SCell dormancy indication information field represents one of the following indications: the joint indication of the dormancy and/or the adaptation of the PCell and the dormancy and/or the adaptation of the SCell or the SCell group; the indication of the dormancy and/or the adaptation of the PCell; or the indication for configuring the SCell dormancy indication information field as the default information bits. Therefore, the information transmission method of the present disclosure may interpret the representation result of the SCell dormancy indication information field only based on the different values of the indication information without changing the size of the DCI format, and dynamically adjust the monitoring behavior of the terminal to the PDCCH, so as to achieve the effect of power saving.

It is noted that in the present disclosure, the indication information may be configured in various ways. For example, the indication information may be configured according to the target information field, the target parameter, or the configuration information of the high-layer parameters. Correspondingly, when the terminal attempts to obtain the indication information for the SCell dormancy indication information field, the indication information may be obtained in a matching way.

In an embodiment, the base station may assign a value to the target information field in the DCI, and configure the target information field assigned as the indication information. Alternatively, when the base station configures the indication information according to the configuration information of the high-layer parameters, the terminal may receive a signaling carrying the indication information sent by the base station. The target information field at least includes a carrier indicator field.

Further, the representation result of the SCell dormancy indication information field may be obtained according to the assignment of the carrier indicator field. If the assignment of the carrier indicator field is zero, or the carrier indicator field is zero bit, the SCell dormancy indication information field represents the indication of the dormancy of the SCell group. If the assignment of the carrier indicator field is non-zero, the SCell dormancy indication information field represents one of the following indications: the joint indication of the dormancy and/or the adaptation of the PCell and the dormancy and/or the adaptation of the SCell or the SCell group; the indication of the dormancy and/or the adaptation of the PCell; or the indication for configuring the SCell dormancy indication information field as the default information bits.

If the signaling is the first high-layer signaling, and the signaling is configured with SCell groups, the size of the SCell dormancy indication information field of the SCell groups is equal to the sum of the number of bits of the indication of the dormancy and/or the adaptation of the PCell and the number of the SCell groups. After the terminal receives the DCI, the indication of the dormancy and/or the adaptation of the PCell and/or the SCell or the SCell group may be dynamically adjusted according to at least one joint monitoring indication way of the dormancy and/or the adaptation of the PCell and the dormancy and/or the adaptation of the SCell or the SCell group from the base station side. The related adaptation parameter configuration for the PDCCH monitoring may be configured through the high-layer signaling.

If the signaling is the first high-layer signaling, and the signaling is not configured with a SCell group, the signaling may be interpreted as the PDCCH monitoring indication of the dormancy and/or the adaptation of the PCell through a switch configured by the high-layer parameters.

The size of the SCell dormancy indication information field may be the same as or different from a specified value in Rel-15, Rel-16 and other versions. It is noted that when the size of the SCell dormancy indication information field is the same as the specified value in the Rel-15 version, the DCI of the Rel-15 version may be reused, without increasing the receiving complexity of the terminal, and at the same time, it is also possible to indicate the dormancy and/or the adaptation of the PCell and/or the SCell or the SCell group for the PDCCH monitoring, thereby achieving the terminal's power saving.

In an embodiment, a target parameter may be obtained. The target parameter is configured for the indication information, and the target parameter includes at least one selected from a version parameter of the terminal and a capability parameter of the terminal.

It is noted that when it is determined that the SCell dormancy indication information field represents the indication of adaptation of the PCell, a third high-layer signaling sent by the base station may be received, and the adaptation behavior of the PCell is configured according to the third high-layer signaling. The adaptation behavior of the PCell includes performing monitoring according to candidate values of one or more parameters in a parameter set configured for the PDCCH monitoring.

It is noted that when it is determined that the SCell dormancy indication information field represents an indication of whether the PCell is dormant, a fourth high-layer signaling sent by the base station may be received, and the dormancy behavior of the PCell may be configured according to the fourth high-layer signaling. The dormancy behavior of the PCell includes skipping one or more PDCCH monitoring occasions.

According to the information transmission method in embodiments of the present disclosure, the indication information for the SCell dormancy indication information field may be obtained in different ways. Optionally, the signaling carrying the indication information sent by the base station may be received. Optionally, the target parameter may be obtained. Therefore, the information transmission method of the present disclosure may configure the indication information in different ways, which ensures the validity and the reliability of the configuration of the indication information, and further improves the power saving effect.

It is noted that since the information transmission method of the present disclosure is applied to the scenario where the DCI carries the scheduling information, the base station may add 0 to 5 bits to configure the SCell dormancy indication information field of the SCell group in the DCI. Therefore, before trying to decoding the SCell dormancy indication information field according to the indication information, the information field size of the SCell dormancy indication information field may be identified, so as to determine an available information field size of the SCell dormancy indication information field.

Optionally, on the basis of the above-mentioned embodiments, before obtaining the monitoring indication represented by the SCell dormancy indication information field for monitoring the PDCCH according to the indication information and the SCell dormancy indication information field as described in the above-mentioned step S203, the terminal may receive the second high-layer signaling sent by the base station. The second high-layer signaling carries the information field size of the SCell dormancy indication information field.

Further, on the basis of the above-mentioned embodiments, after obtaining the actual indication represented by the SCell dormancy indication information field for monitoring the PDCCH as described in the above-mentioned step S503, the terminal may switch the monitoring behavior of the PCell and/or the SCell or the SCell group according to the indication.

Figure 8:
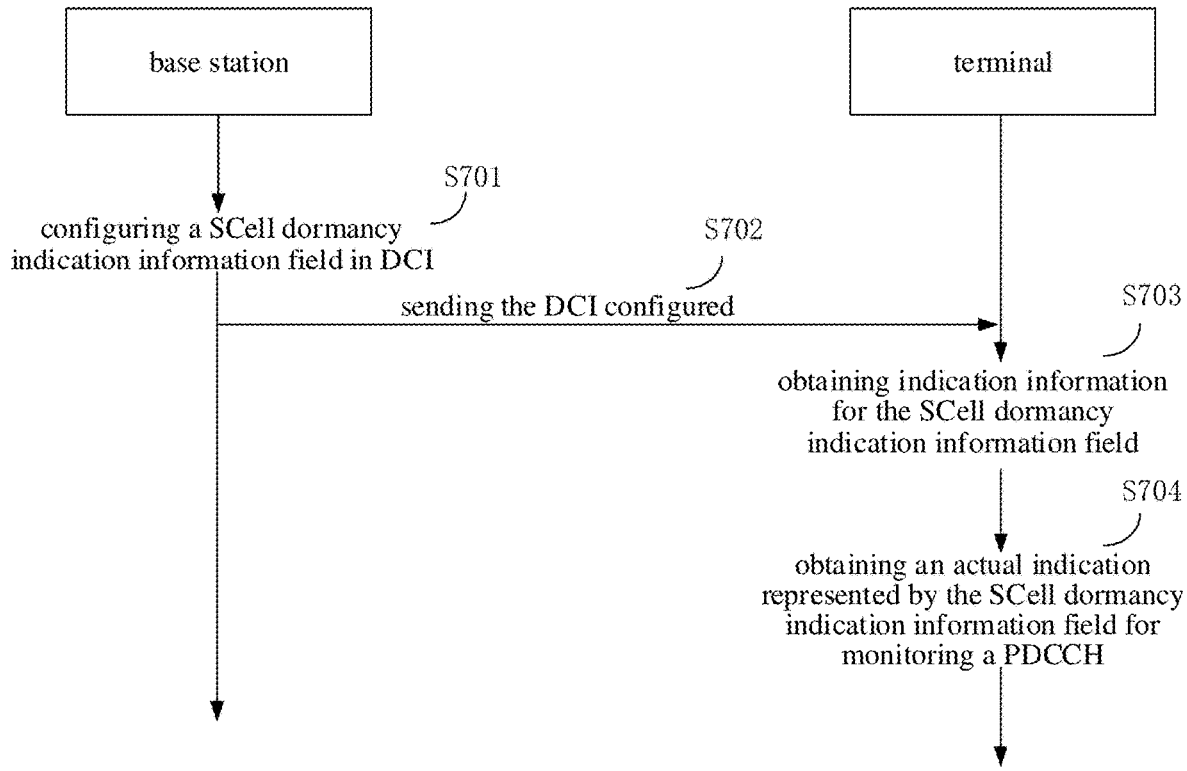
FIG. 8 is a schematic diagram according to an embodiment of the present disclosure.

FIG. 8 is a schematic diagram according to a seventh embodiment of the present disclosure. As shown in FIG. 8, an information transmission method according to embodiments of the present disclosure is described with reference to a complete transmission process of the DCI, and the information transmission method includes the following steps S701 and S704.

In step S701, a base station configures a SCell dormancy indication information field in DCI.

In step S702, the base station sends the DCI configured to the terminal.

In embodiments of the present disclosure, the base station may configure the SCell dormancy indication information field in the DCI, and send the DCI configured to the terminal. The SCell dormancy indication information field represents an actual indication for monitoring the PDCCH, and the actual indication is determined by the terminal according to the indication information.

It is noted that, for different values of the indication information, and indications represented by the SCell dormancy indication information field are also different. If the indication information is a first value, the SCell dormancy indication information field represents an indication of whether the SCell or a SCell group is dormant. If the indication information is a second value, the SCell dormancy indication information field represents one of the following indications: a joint indication of dormancy and/or adaptation of a PCell and dormancy and/or adaptation of the SCell or the SCell group; an indication of dormancy and/or adaptation of the PCell; or an indication for configuring the SCell dormancy indication information field as default information bits.

Optionally, the base station may receive a target parameter sent by the terminal, and configure the SCell dormancy indication information field according to the target parameter. The target parameter includes at least one selected from a version parameter of the terminal and a capability parameter of the terminal. Further, the base station sends the DCI configured to the terminal.

In step S703, the terminal obtains indication information for the SCell dormancy indication information field.

In step S704, the terminal obtains an actual indication represented by the SCell dormancy indication information field for monitoring the PDCCH according to the indication information and the SCell dormancy indication information field.

The above-mentioned steps S701 to S702 are the same as the steps S101 to S102 in the embodiments shown in FIG. 1, and the above-mentioned steps S703 to S704 are the same as the steps S402 to S403 in the embodiments shown in FIG. 5, so they will not be repeated here.

It is noted that the indication information obtained by the terminal for the SCell dormancy indication information field includes but is not limited to the following information: a terminal version indication, a UE capability indication, high-layer parameter configuration, a value of a specific information field in the DCI format, and the like. The specific introduction about the indication information may refer to the descriptions of relevant contents in the above-mentioned embodiments, and will not be repeated here.

According to the information transmission method in embodiments of the present disclosure, the base station may configure the SCell dormancy indication information field of the SCell group in the DCI, and send the DCI configured to the terminal. The terminal obtains the indication information for the SCell dormancy indication information field, and decodes the SCell dormancy indication information field according to the indication information, so as to obtain the monitoring indication for monitoring the PDCCH represented by the SCell dormancy indication information field. Therefore, the information transmission method of the present disclosure may configure the SCell dormancy indication information field of the SCell group in the DCI and the indication information through the base station, and send the DCI and the indication information configured to the terminal, so that the terminal may interpret the representation result of the SCell dormancy indication information based on different values of the indication information, and dynamically adjust the monitoring behavior of the terminal to the PDCCH according to the representation result. In this way, the monitoring behavior on the PDCCH has better adaptive ability, which may effectively solve the power consumption problem of continuous monitoring the PDCCH in fixed configurations, so that the terminal may achieve the effect of power saving.

It is noted that the base station mentioned in embodiments of the present disclosure may include a plurality of cells that provide services for the terminal. Depending on the specific application situations, the base station may be called an access point, or a device in an access network that communicates with a wireless terminal device through one or more sectors on an air interface, or other names. The base station may be configured to interchange received over-the-air frames with internet protocol (IP) packets, and used as a router between the wireless terminal device and the rest of the access network. The rest of the access network may include the IP communication network. Network devices may also coordinate attribute management for the air interface. For example, the base station in embodiments of the present disclosure may be a network device (such as a base transceiver station, BTS) in global system for mobile communications (GSM) or code division multiple access (CDMA), a network device (such as NodeB) in wide-band code division multiple access (WCDMA), an evolutional network device (such as an evolutional NodeB, eNB or e-NodeB for short) in a long term evolution (LTE) system, a 5G base station (such as gNB) in a 5G network architecture (next generation system), a home evolved Node B (HeNB), a relay node, a femto base station, a pico base station and the like, which is not limited in embodiments of the present disclosure.

The base station and the terminal device each may use one or more antennas to perform multiple input multiple output (MIMO) transmission therebetween, and the MIMO transmission may be a single user MIMO (SU-MIMO) or multi-user MIMO (MU-MIMO). According to the combination form and the number of the antennas, the MIMO transmission may be 2D-MIMO, 3D-MIMO, FD-MIMO, massive-MIMO, diversity transmission, precoded transmission, or beamforming transmission.

Corresponding to the information transmission method in the above-mentioned embodiments, embodiments of the present disclosure also provide an information transmission apparatus. Since the information transmission apparatus in embodiments of the present disclosure corresponds to the information transmission method as described in the above-mentioned embodiments, so implementations of the information transmission method are also applicable to the information transmission apparatus according to embodiments of the present disclosure, which will not be described in detail in embodiments of the information transmission apparatus.

Figure 9:
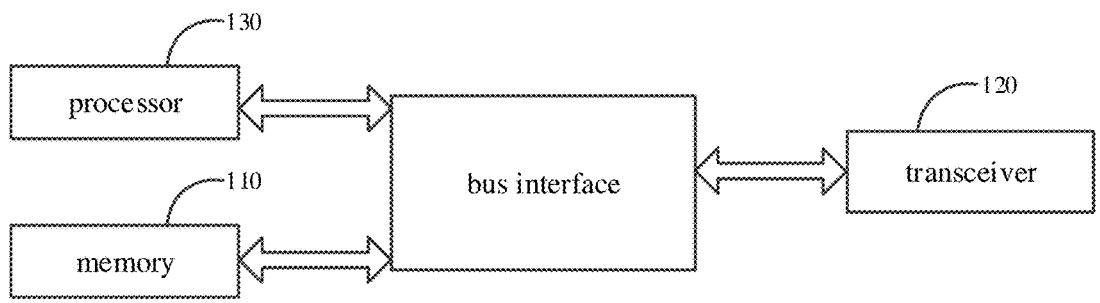
FIG. 9 is a block diagram of a network side device.

FIG. 9 is a schematic diagram showing a network side device according to an embodiment of the present disclosure.

As shown in FIG. 9, the network side device 1000 is applied to a scenario where DCI carries scheduling information, and includes: a memory 110, a transceiver 120, and a processor 130.

The memory 110 is configured to store computer programs.

The transceiver 120 is configured to send and receive data under a control of the processor.

The processor 130 is configured to read the computer programs in the memory to: configure a SCell dormancy indication information field in the DCI; configure indication information for the SCell dormancy indication information field, in which the indication information is configured to instruct a terminal to encode the SCell dormancy indication information field according to the indication information to obtain an actual indication represented by the SCell dormancy indication information field for monitoring a physical downlink control channel (PDCCH); and send the DCI and the indication information configured to the terminal.

In embodiments of the present disclosure, the processor 130 is further configured to read the computer programs in the memory to: if the indication information is a first value, determine that the SCell dormancy indication information field represents an indication of whether the SCell or a SCell group is dormant; if the indication information is a second value, determine that the SCell dormancy indication information field represents one of the following indications: a joint indication of dormancy and/or adaptation of a primary cell (PCell) and dormancy and/or adaptation of the SCell or the SCell group; an indication of dormancy and/or adaptation of the PCell; or an indication for configuring the SCell dormancy indication information field as default information bits.

In embodiments of the present disclosure, the processor 130 is further configured to assign a value to a target information field, and configure the target information field assigned as the indication information.

In embodiments of the present disclosure, the target information field at least includes a carrier indicator field. The indication information is carried in the DCI and sent to the terminal.

In embodiments of the present disclosure, the target information field at least includes a carrier indicator field. The indication information is carried in the DCI and sent to the terminal.

In embodiments of the present disclosure, the processor 130 is further configured to: if an assignment of the carrier indicator field is zero or the carrier indicator field is zero bit, determine that the SCell dormancy indication information field represents an indication of whether the SCell or the SCell group is dormant; if the assignment of the carrier indicator field is non-zero, determine that the SCell dormancy indication information field represents one of the following indications: a joint monitoring indication of dormancy and/or adaptation of a PCell and dormancy and/or adaptation of a SCell group; a monitoring indication of dormancy and/or adaptation of the PCell; or an indication for configuring the SCell dormancy indication information field as default information bits.

In embodiments of the present disclosure, the processor 130 is further configured to: receive a target parameter sent by the terminal, in which the target parameter includes at least one selected from a version parameter of the terminal and a capability parameter of the terminal; and configure the SCell dormancy indication information field according to the target parameter.

In embodiments of the present disclosure, the processor 130 is further configured to: configure configuration information of high-layer parameters; configure the indication information according to the configuration information; and send the indication information to the terminal with a first high-layer signaling.

In embodiments of the present disclosure, the processor 130 is further configured to send a second high-layer signaling to the terminal. The second high-layer signaling carries an information field size of the SCell dormancy indication information field.

In embodiments of the present disclosure, the processor 130 is further configured to send a third high-layer signaling to the terminal if the SCell dormancy indication information field represents the indication of the adaptation of the PCell. The third high-layer signaling is configured to instruct the terminal to configure an adaptation behavior of the PCell. The adaptation behavior of the PCell comprises performing monitoring according to candidate values of one or more parameters in a parameter set configured for the PDCCH monitoring.

In embodiments of the present disclosure, the candidate values are a subset of values in a value set configured for the one or more parameters, or values different from those in the value set.

In embodiments of the present disclosure, the processor 130 is further configured to send a fourth high-layer signaling to the terminal if the SCell dormancy indication information field represents the indication of the dormancy of the PCell. The fourth high-layer signaling is configured to instruct the terminal to configure a dormancy behavior of the PCell, and the dormancy behavior of the PCell includes skipping one or more PDCCH monitoring occasions.

In embodiments of the present disclosure, the processor 130 is further configured to send a fifth high-layer signaling to the terminal if the SCell dormancy indication information field represents the indication of the dormancy and the adaptation of the PCell. The fifth high-layer signaling is configured to instruct the terminal to configure a joint monitoring behavior of the PCell including a dormancy behavior and an adaptation behavior, and the joint monitoring behavior includes skipping one or more PDCCH monitoring occasions, and performing adaptation adjustment on one or more parameters in a parameter set configured for the PDCCH monitoring.

In embodiments of the present disclosure, the processor 130 is further configured to send a sixth high-layer signaling to the terminal. The sixth high-layer signaling carries a mapping relationship between the joint indication and monitoring behaviors of the PCell and the SCell or the SCell group.

In the network side device 1000 shown in FIG. 9, the processor 130 is configured to read the computer program in the memory to: configure the SCell dormancy indication information field in the DCI; and send the DCI configured to the terminal. The SCell dormancy indication information field represents the actual indication for monitoring the PDCCH, and the actual indication is determined by the terminal according to the indication information.

The processor 130 is further configured to read the computer programs in the memory to: if the indication information is a first value, determine that the SCell dormancy indication information field represents an indication of whether the SCell or the SCell group is dormant; and if the indication information is a second value, determine that the SCell dormancy indication information field represents one of the following indications: a joint indication of dormancy and/or adaptation of a primary cell (PCell) and dormancy and/or adaptation of the SCell or the SCell group; an indication of dormancy and/or adaptation of the PCell; or an indication for configuring the SCell dormancy indication information field as default information bits.

The processor is further configured to read the computer program in the memory to receive a target parameter sent by the terminal, and configure the SCell dormancy indication information field according to the target parameter. The target parameter includes at least one selected from a version parameter of the terminal and a capability parameter of the terminal.

Figure 10:
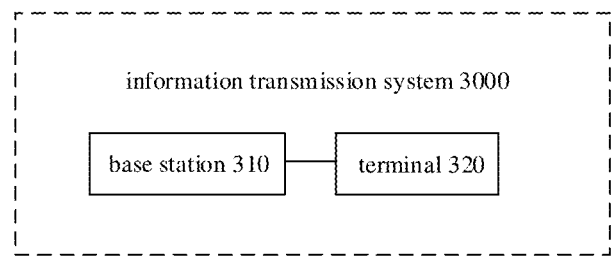
FIG. 10 is a block diagram of an information transmission system.

FIG. 10 is a schematic diagram showing an information transmission system according to an embodiment of the present disclosure.

As shown in FIG. 10, the information transmission system 3000 is applied to a scenario where DCI carries scheduling information, and includes a base station 310 and a terminal 320.

The base station 310 is configured to configure a SCell dormancy indication information field in the DCI, and send the DCI configured to the terminal.

The terminal 320 is configured to obtain indication information for the SCell dormancy indication information field, and decode the SCell dormancy indication information field according to the indication information, to obtain an actual indication represented by the SCell dormancy indication information field for monitoring a PDCCH.

Figure 11:
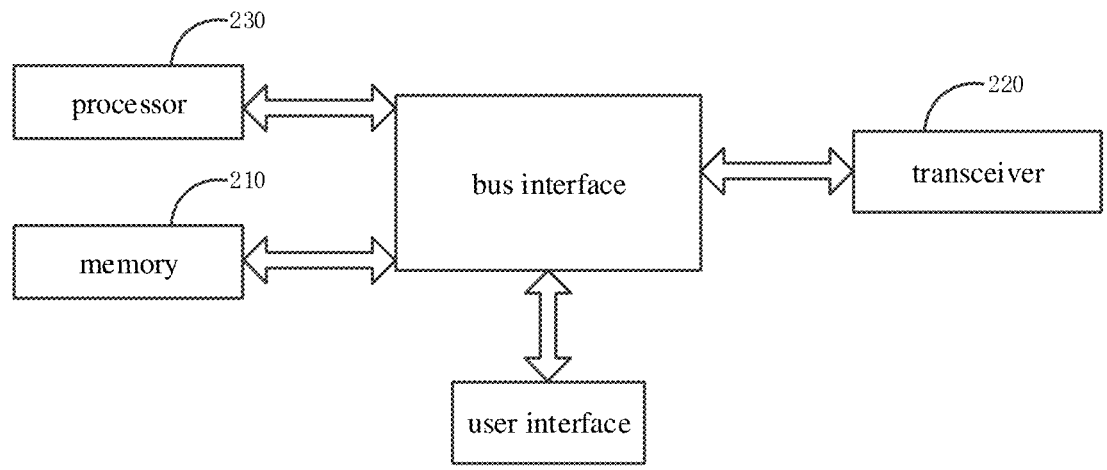
FIG. 11 is a block diagram of a terminal.

FIG. 11 is a schematic diagram showing a terminal according to an embodiment of the present disclosure.

As shown in FIG. 11, the terminal 2000 is applied to a scenario where DCI carries scheduling information, and includes a memory 210, a transceiver 220, and a processor 230.

The memory 210 is configured to store computer programs.

The transceiver 220 is configured to send and receive data under a control of the processor.

The processor 230 is configured to read the computer programs in the memory to receive the DCI sent by a base station, in which the DCI carries a SCell dormancy indication information field; obtain indication information for the SCell dormancy indication information field; and obtain, according to the indication information and the SCell dormancy indication information field, an actual indication represented by the SCell dormancy indication information field for monitoring a PDCCH.

In embodiments of the present disclosure, the processor 230 is further configured to: in response to determining that the indication information is a first value, determine that the SCell dormancy indication information field represents an indication of dormancy of the SCell or a SCell group; or in response to determining that the indication information is a second value, determine that the SCell dormancy indication information field represents one of the following indications: a joint indication of dormancy and/or adaptation of a PCell and dormancy and/or adaptation of the SCell or the SCell group; an indication of dormancy and/or adaptation of the PCell; or an indication for configuring the SCell dormancy indication information field as default information bits.

In embodiments of the present disclosure, the processor 230 is further configured to read the computer program in the memory to receive a signaling carrying the indication information sent by the base station.

In embodiments of the present disclosure, the signaling carries a target information field, and the target information field is configured to carry the indication information; or the signaling is a first high-layer signaling, and the indication information is configured according to configuration information of high-layer parameters.

In embodiments of the present disclosure, the target information field at least includes a carrier indicator field in the DCI, and the signaling is the DCI.

In embodiments of the present disclosure, the processor 230 is further configured to: when the carrier indicator field is configured to carry the indication information, if an assignment of the carrier indicator field is zero or the carrier indicator field is zero bit, interpret the SCell dormancy indication information field as representing an indication of whether the SCell or the SCell group is dormant; if the assignment of the carrier indicator field is non-zero, interpret the SCell dormancy indication information field as representing one of the following indications: a joint indication of dormancy and/or adaptation of the PCell and dormancy and/or adaptation of the SCell group; an indication of the dormancy and/or the adaptation of the PCell; or an indication for configuring the SCell dormancy indication information field as default information bits.

In embodiments of the present disclosure, the processor 230 is further configured to determine a target parameter on a terminal side as the indication information. The target parameter is configured for the indication information, and the target parameter includes at least one selected from a version parameter of the terminal and a capability parameter of the terminal.

In embodiments of the present disclosure, the processor 230 is further configured to obtain an information field size of the SCell dormancy indication information field.

In embodiments of the present disclosure, the processor 230 is further configured to receive a second high-layer signaling sent by the base station, and extract the information field size from the second high-layer signaling.

In embodiments of the present disclosure, the processor 230 is further configured to receive a third high-layer signaling sent by the base station in response to determining that the SCell dormancy indication information field represents the indication of the adaptation of the PCell; and configure an adaptation behavior of the PCell according to the third high-layer signaling. The adaptation behavior of the PCell includes performing monitoring according to candidate values of one or more parameters in a parameter set configured for the PDCCH monitoring.

In embodiments of the present disclosure, the candidate values are a subset of values in a value set configured for the one or more parameters, or values different from those in the value set.

In embodiments of the present disclosure, the processor 230 is further configured to: receive a fourth high-layer signaling sent by the base station; and configure a dormancy behavior of the PCell according to the fourth high-layer signaling. The dormancy behavior of the PCell includes skipping one or more PDCCH monitoring occasions.

In embodiments of the present disclosure, the processor 230 is further configured to: receive a fifth high-layer signaling sent by the base station; and configure a joint monitoring behavior of the PCell including a dormancy behavior and an adaptation behavior according to the fifth high-layer signaling. The joint monitoring behavior includes skipping one or more PDCCH monitoring occasions; and performing adaptation adjustment on one or more parameters in a parameter set configured for the PDCCH monitoring.

In embodiments of the present disclosure, the processor 230 is further configured to determine a value corresponding to the SCell dormancy indication information field as the joint indication, and decode monitoring behaviors of the PCell and the SCell or the SCell group according to the value.

In embodiments of the present disclosure, the processor 230 is further configured to determine that the SCell dormancy indication information field represents the joint indication of the dormancy and/or the adaptation of the PCell and the dormancy and/or the adaptation of the SCell or the SCell group. The method further includes receiving a sixth high-layer signaling sent by the base station, and extracting a mapping relationship between the joint indication and monitoring behaviors of the PCell and the SCell or the SCell group from the sixth high-layer signaling.

In embodiments of the present disclosure, the processor 230 is further configured to switch a monitoring behavior of the PCell and/or a monitoring behavior of the SCell or the SCell group according to the indication represented for monitoring the PDCCH.

Figure 12:
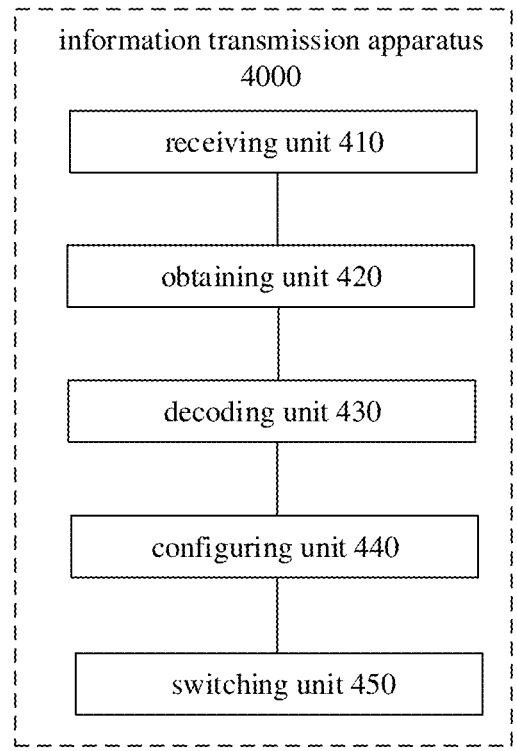
FIG. 12 is a schematic diagram of an information transmission apparatus.

FIG. 12 is a schematic diagram showing an information transmission apparatus according to an embodiment of the present disclosure.

As shown in FIG. 12, the information transmission apparatus 4000 includes a receiving unit 410, an obtaining unit 420 and a decoding unit 430.

The receiving unit 410 is configured to receive the DCI sent by the base station. The DCI carries a SCell dormancy indication information field.

The obtaining unit 420 is configured to obtain indication information for the SCell dormancy indication information field.

The decoding unit 430 is configured to obtain an actual indication represented by the SCell dormancy indication information field for monitoring a PDCCH according to the indication information and the SCell dormancy indication information field.

The decoding unit 430 is further configured to: in response to determining that the indication information is a first value, determine that the SCell dormancy indication information field represents an indication of dormancy of the SCell or a SCell group; or in response to determining that the indication information is a second value, determine that the SCell dormancy indication information field represents one of the following indications: a joint indication of dormancy and/or adaptation of a PCell and dormancy and/or adaptation of the SCell or the SCell group; an indication of dormancy and/or adaptation of the PCell; or an indication for configuring the SCell dormancy indication information field as default information bits.

Optionally, the obtaining unit 420 is further configured to receive a signaling carrying the indication information sent by the base station.

The signaling carries a target information field, and the target information field is configured to carry the indication information. Alternatively, the signaling is a first high-layer signaling, and the indication information is configured according to configuration information of high-layer parameters.

Further, the target information field at least includes a carrier indicator field in the DCI, and the signaling is the DCI.

Further, when the carrier indicator field is configured to carry the indication information, if an assignment of the carrier indicator field is zero or the carrier indicator field is zero bit, the SCell dormancy indication information field is interpreted as representing an indication of whether the SCell or the SCell group is dormant.

If the assignment of the carrier indicator field is non-zero, the SCell dormancy indication information field is interpreted as representing one of the following indications: a joint indication of dormancy and/or adaptation of the PCell and dormancy and/or adaptation of the SCell group; an indication of the dormancy and/or the adaptation of the PCell; or an indication for configuring the SCell dormancy indication information field as default information bits.

Optionally, the obtaining unit 420 is further configured to determine a target parameter on a terminal side as the indication information. The target parameter is configured as the indication information, and the target parameter includes at least one selected from a version parameter of the terminal and a capability parameter of the terminal.

Optionally, the obtaining unit 420 is further configured to obtain an information field size of the SCell dormancy indication information field.

Optionally, the obtaining unit 420 is further configured to receive a second high-layer signaling sent by the base station, and extract the information field size from the second high-layer signaling.

Optionally, the terminal further includes a configuring unit 440.

The obtaining unit 420 is further configured to receive a third high-layer signaling sent by the base station in response to determining that the SCell dormancy indication information field represents the indication of the adaptation of the PCell.

The configuring unit 440 is configured to configure an adaptation behavior of the PCell according to the third high-layer signaling. The adaptation behavior of the PCell includes performing monitoring according to candidate values of one or more parameters in a parameter set configured for the PDCCH monitoring.

Further, the candidate values are a subset of values in a value set configured for the one or more parameters, or values different from those in the value set.

The obtaining unit 420 is further configured to receive a fourth high-layer signaling sent by the base station in response to determining that the SCell dormancy indication information field represents the indication of the dormancy of the PCell.

The configuring unit 440 is further configured to configure a dormancy behavior of the PCell according to the fourth high-layer signaling. The dormancy behavior of the PCell includes skipping one or more PDCCH monitoring occasions.

The obtaining unit 420 is further configured to receive a fifth high-layer signaling sent by the base station in response to determining that the SCell dormancy indication information field represents the indication of the dormancy and the adaptation of the PCell.

The configuring unit 440 is further configured to configure a joint monitoring behavior of the PCell including a dormancy behavior and an adaptation behavior according to the fifth high-layer signaling. The joint monitoring behavior includes skipping one or more PDCCH monitoring occasions; and performing adaptation adjustment on one or more parameters in a parameter set configured for the PDCCH monitoring.

The obtaining unit 420 is further configured to determine a value corresponding to the SCell dormancy indication information field as the joint indication, and decode monitoring behaviors of the PCell and the SCell or the SCell group according to the value, in response to determining that the SCell dormancy indication information field represents the joint indication of the dormancy and/or the adaptation of the PCell and the dormancy and/or the adaptation of the SCell or the SCell group.

The obtaining unit 420 is further configured to: in response to determining that the SCell dormancy indication information field represents the joint indication of the dormancy and/or the adaptation of the PCell and the dormancy and/or the adaptation of the S Cell or the SCell group, receive a sixth high-layer signaling sent by the base station, extract a mapping relationship between the joint indication and monitoring behaviors of the PCell and the SCell or the SCell group from the sixth high-layer signaling, and index the mapping relationship according to the joint indication corresponding to the SCell dormancy indication information field to obtain the monitoring behavior of the PCell and the SCell or the SCell group.

Optionally, the terminal further includes a switching unit 450.

The switching unit 450 is configured to switch a monitoring behavior of the PCell and/or the SCell or the SCell group according to the indication represented for monitoring the PDCCH.

Figure 13:
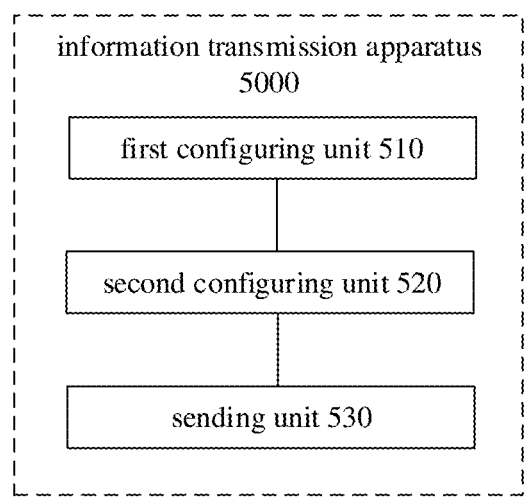
FIG. 13 is a schematic diagram of an information transmission apparatus.

FIG. 13 is a schematic diagram showing another information transmission apparatus according to an embodiment of the present disclosure.

As shown in FIG. 13, the information transmission apparatus 5000 includes a first configuring unit 510, a second configuring unit 520 and a sending unit 530.

The first configuring unit 510 is configured to configure a SCell dormancy indication information field in DCI.

The second configuring unit 520 is configured to configure indication information for the SCell dormancy indication information field. The indication information is configured to instruct a terminal to obtain an actual information for monitoring a PDCCH represented by the SCell dormancy indication information field.

The sending unit 530 is configured to send the DCI and the indication information configured to the terminal.

Further, if the indication information is a first value, the SCell dormancy indication information field represents an indication of whether the SCell or a SCell group is dormant.

If the indication information is a second value, the SCell dormancy indication information field represents one of the following indications: a joint indication of dormancy and/or adaptation of a PCell and dormancy and/or adaptation of the SCell or the SCell group; an indication of dormancy and/or adaptation of the PCell; or an indication for configuring the S Cell dormancy indication information field as default information bits.

Optionally, the second configuring unit 520 is further configured to assign a value to a target information field, and configure the target information field assigned as the indication information.

Further, the target information field at least includes a carrier indicator field. The indication information is carried in the DCI and sent to the terminal.

Further, if an assignment of the carrier indicator field is zero or the carrier indicator field is zero bit, the SCell dormancy indication information field represents an indication of whether the SCell or the SCell group is dormant.

If the assignment of the carrier indicator field is non-zero, the SCell dormancy indication information field represents one of the following indications: a joint indication of dormancy and/or adaptation of the PCell and dormancy and/or adaptation of the SCell or the SCell group; an indication of dormancy and/or adaptation of the PCell; or an indication for configuring the SCell dormancy indication information field as default information bits.

Further, optionally, the first configuring unit 510 is further configured to receive a target parameter sent by the terminal, and configure the SCell dormancy indication information field according to the target parameter. The target parameter includes at least one selected from a version parameter of the terminal and a capability parameter of the terminal.

Optionally, the second configuring unit 520 is further configured to configure configuration information of higher layer parameters, configure the indication information according to the configuration information, and send the indication information to the terminal with a first high-layer signaling.

Optionally, the sending unit 530 is further configured to send a second high-layer signaling to the terminal. The second high-layer signaling carries an information field size of the SCell dormancy indication information field.

Optionally, the sending unit 530 is further configured to send a third high-layer signaling to the terminal if the SCell dormancy indication information field represents the indication of the adaptation of the PCell. The third high-layer signaling is configured to instruct the terminal to configure an adaptation behavior of the PCell. The adaptation behavior of the PCell includes performing monitoring according to candidate values of one or more parameters in a parameter set configured for the PDCCH monitoring.

Further, the candidate values are a subset of values in a value set configured for the one or more parameters, or values different from those in the value set.

Optionally, the sending unit 530 is further configured to send a fourth high-layer signaling to the terminal if the SCell dormancy indication information field represents the indication of the dormancy of the PCell. The fourth high-layer signaling is configured to instruct the terminal to configure a dormancy behavior of the PCell, and the dormancy behavior of the PCell includes skipping one or more PDCCH monitoring occasions.

Optionally, the sending unit 530 is further configured to send a fifth high-layer signaling to the terminal if the SCell dormancy indication information field represents the indication of the dormancy and the adaptation of the PCell. The fifth high-layer signaling is configured to instruct the terminal to configure a joint monitoring behavior of the PCell including a dormancy behavior and an adaptation behavior. The joint monitoring behavior includes skipping one or more PDCCH monitoring occasions, and performing adaptation adjustment on one or more parameters in a parameter set configured for the PDCCH monitoring.

Optionally, the sending unit 530 is further configured to: if the SCell dormancy indication information field represents the joint indication of the dormancy and/or the adaptation of the PCell and the dormancy and/or the adaptation of the SCell or the SCell group, determine a value corresponding to the SCell dormancy indication information field as the joint indication, and send a sixth high-layer signaling to the terminal. The sixth high-layer signaling carries a mapping relationship between the joint indication and monitoring behaviors of the PCell and the SCell or the SCell group.

Figure 14:
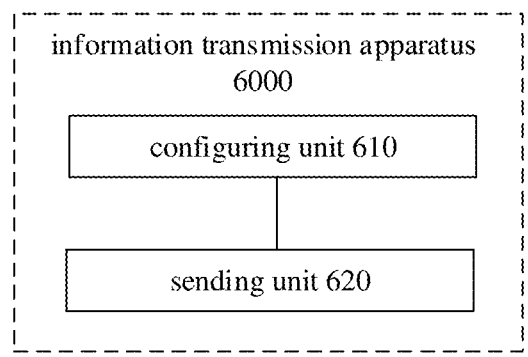
FIG. 14 is a schematic diagram of an information transmission apparatus.

FIG. 14 is a schematic diagram showing another information transmission apparatus according to an embodiment of the present disclosure.

As shown in FIG. 14, the information transmission apparatus 6000 includes a configuring unit 610 and a sending unit 620.

The configuring unit 610 is configured to configure a SCell dormancy indication information field in DCI.

The sending unit 620 is configured to send the DCI configured to the terminal. The SCell dormancy indication information field represents an actual indication for monitoring the PDCCH, and the actual indication is determined by the terminal according to the indication information.

Further, if the indication information is a first value, the SCell dormancy indication information field represents an indication of whether the SCell or the SCell group is dormant.

If the indication information is a second value, the SCell dormancy indication information field represents one of the following indications: a joint indication of dormancy and/or adaptation of a PCell and dormancy and/or adaptation of the SCell or the SCell group; an indication of dormancy and/or adaptation of the PCell; or an indication for configuring the SCell dormancy indication information field as default information bits.

Optionally, the configuring unit 610 is further configured to receive a target parameter sent by the terminal, and configure the SCell dormancy indication information field according to the target parameter. The target parameter includes at least one selected from a version parameter of the terminal and a capability parameter of the terminal.

The method and the apparatus are based on the same inventive concept. Since the principles of the method and apparatus for solving problems are similar, implementations of the apparatus and method may be referred to each other, and the similarity will not be repeated.

It is noted that the division of the units in embodiments of the present disclosure is illustrative, and is only a logical function division, and there may be other division ways in actual implementation. In addition, functional units in embodiments of the present disclosure may be integrated into one processing unit, or each unit may physically exist separately, or two or more units may be integrated into one unit. The above-mentioned integrated unit may be implemented in a form of hardware or in a form of software functional unit.

If the integrated unit is implemented in the form of the software function unit and sold or used as an independent product, it may be stored in a processor-readable storage medium. Based on such understanding, the technical solution of the present disclosure, or a part of the technical solution that makes contribution to the prior art, or all or part of the technical solution can be embodied in the form of software product, and the computer software product is stored in a storage medium and includes several indications to enable a computer device (which may be a personal computer, a server, or a network device, etc.) or a processor to execute all or part of the steps of the methods described in embodiments of the present disclosure. The above-mentioned storage medium includes a USB flash disk, a mobile hard disk, a read-only memory (ROM), a random access memory (RAM), a magnetic disk, an optical disk, and other mediums that can store program codes.

It is noted that the above-mentioned apparatus in embodiments of the present disclosure can realize all steps of the methods achievable by the above-mentioned method embodiments, and can achieve the same technical effects. The same parts and beneficial effects in the apparatus embodiments as those in the method embodiments will not be described here.

According to embodiments of the present disclosure, the present disclosure also provides a processor-readable storage medium. The processor-readable storage medium has stored therein computer programs that, when executed by a processor, cause the processor to perform the DCI transmission method as described in the first aspect of the present disclosure, or the DCI transmission method as described in the second aspect of the present disclosure, or the DCI transmission method as described in the third aspect of the present disclosure.

The processor-readable storage medium may be any available medium or data storage device that may be accessed by a processor, including but not limited to magnetic memories (e.g., a floppy disk, a hard disk, a magnetic tape, a magneto-optical disk (MO), etc.), optical memories (e.g., CD, DVD, BD, HVD, etc.), and semiconductor memories (such as ROM, EPROM, EEPROM, non-volatile memory (NAND FLASH), solid state disk (SSD), etc.).

It is understood that steps may be reordered, added or deleted using the various forms of flow shown above. For example, the steps described in the present disclosure may be executed in parallel, sequentially, or in a different order, as long as the desired result of the technical solution disclosed in the present disclosure can be achieved, which is not limited here.

The above specific embodiments are not intended to limit the protection scope of the present disclosure. It is apparent to those skilled in the art that various modifications, combinations, sub-combinations and substitutions may be made depending on design requirements and other factors. Any modifications, equivalent replacements and improvements made within the spirit and principles of the present disclosure shall be included within the protection scope of the present disclosure.

What is claimed is:

1. An information transmission method, applied to a scenario where downlink control information (DCI) carries scheduling information, and comprising:
   receiving the DCI sent by a base station, wherein the DCI carries a secondary cell (SCell) dormancy indication information field;
   obtaining indication information for the SCell dormancy indication information field; and
   obtaining, according to the indication information and the SCell dormancy indication information field, an actual indication represented by the SCell dormancy indication information field for monitoring a physical downlink control channel (PDCCH);
   wherein obtaining, according to the indication information and the SCell dormancy indication information field, the actual indication represented by the SCell dormancy indication information field for monitoring a physical downlink control channel (PDCCH) comprises:
   in response to determining that the indication information is a first value, determining that the SCell dormancy indication information field represents an indication of whether the SCell or a SCell group is dormant; or
   in response to determining that the indication information is a second value, determining that the SCell dormancy indication information field represents one of:
      a joint indication of dormancy and/or adaptation of a primary cell (PCell) and dormancy and/or adaptation of the SCell or the SCell group;
      an indication of dormancy and/or adaptation of the PCell; or
      an indication for configuring the SCell dormancy indication information field as default information bits.

2. The method according to claim 1, wherein obtaining the indication information for the SCell dormancy indication information field comprises:
   receiving a signaling carrying the indication information sent by the base station, wherein the signaling carries a target information field, and the target information field is configured to carry the indication information; or the signaling is a first high-layer signaling, and the indication information is configured according to configuration information of high-layer parameters,
   or
   determining a target parameter on a terminal side as the indication information, wherein the target parameter is configured for the indication information, and the target parameter comprises at least one selected from a version parameter of the terminal and a capability parameter of the terminal.

3. The method according to claim 2, wherein the target information field at least comprises a carrier indicator field in the DCI, and the signaling is the DCI,
   wherein when the carrier indicator field is configured to carry the indication information,
   if an assignment of the carrier indicator field is zero or the carrier indicator field is zero bit, interpreting the SCell dormancy indication information field as representing an indication of whether the SCell or a SCell group is dormant;
   if the assignment of the carrier indicator field is non-zero, interpreting the SCell dormancy indication information field as representing one of:
      a joint indication of dormancy and/or adaptation of a PCell and dormancy and/or adaptation of the SCell group;
      an indication of the dormancy and/or the adaptation of the PCell; or
      an indication for configuring the SCell dormancy indication information field as default information bits.

4. The method according to claim 1, further comprising:
   obtaining an information field size of the SCell dormancy indication information field,
   wherein obtaining the information field size of the SCell dormancy indication information field comprises:
   receiving a second high-layer signaling sent by the base station, and extracting the information field size from the second high-layer signaling,
   wherein the method further comprises:

switching a monitoring behavior of a PCell and/or a monitoring behavior of the SCell or a SCell group according to the indication represented for monitoring the PDCCH.

5. The method according to claim 1, further comprising:
receiving a third high-layer signaling sent by the base station; and
configuring an adaptation behavior of the PCell according to the third high-layer signaling, in response to determining that the SCell dormancy indication information field represents the indication of the adaptation of the PCell, wherein the adaptation behavior of the PCell comprises performing monitoring according to candidate values of one or more parameters in a parameter set configured for PDCCH monitoring, and the candidate values are a subset of values in a value set configured for the one or more parameters, or values different from those in the value set, or receiving a fourth high-layer signaling sent by the base station; and configuring a dormancy behavior of the PCell according to the fourth high-layer signaling, in response to determining that the SCell dormancy indication information field represents the indication of the dormancy of the PCell, wherein the dormancy behavior of the PCell comprises skipping one or more PDCCH monitoring occasions, or receiving a fifth high-layer signaling sent by the base station; and configuring a joint monitoring behavior of the PCell comprising a dormancy behavior and an adaptation behavior according to the fifth high-layer signaling, in response to determining that the SCell dormancy indication information field represents the indication of the dormancy and the adaptation of the PCell, wherein the joint monitoring behavior comprises skipping one or more PDCCH monitoring occasions, and performing adaptation adjustment on one or more parameters in a parameter set configured for PDCCH monitoring, or determining a value corresponding to the SCell dormancy indication information field as the joint indication, and decoding monitoring behaviors of the PCell and the SCell or the SCell group according to the value, in response to determining that the SCell dormancy indication information field represents the joint indication of the dormancy and/or the adaptation of the PCell and the dormancy and/or the adaptation of the SCell or the SCell group, or receiving a sixth high-layer signaling sent by the base station; and extracting a mapping relationship between the joint indication and monitoring behaviors of the PCell and the SCell or the SCell group from the sixth high-layer signaling, in response to determining that the SCell dormancy indication information field represents the joint indication of the dormancy and/or the adaptation of the PCell and the dormancy and/or the adaptation of the SCell or the SCell group.

6. A terminal, applied to a scenario where DCI carries scheduling information, and comprising:
a memory;
a transceiver; and
a processor;
wherein the memory is configured to store computer programs; the transceiver is configured to send or receive data under a control of the processor, and the processor is configured to read the computer programs in the memory to perform acts of the method according to claim 1.

7. A non-transitory processor-readable storage medium having stored therein computer programs that, when executed by a processor, cause the processor to perform the information transmission method according to claim 1.

8. An information transmission method, applied to a scenario where downlink control information (DCI) carries scheduling information, and comprising:
configuring a secondary cell (SCell) dormancy indication information field in the DCI;
configuring indication information for the SCell dormancy indication information field, wherein the indication information is configured to instruct a terminal to obtain an actual indication represented by the SCell dormancy indication information field for monitoring a physical downlink control channel (PDCCH);
sending the DCI and the indication information configured to the terminal; and
if the indication information is a first value, determining that the SCell dormancy indication information field represents an indication of whether the SCell or a SCell group is dormant;
if the indication information is a second value, determining that the SCell dormancy indication information field represents one of:
a joint indication of dormancy and/or adaptation of a primary cell (PCell) and dormancy and/or adaptation of the SCell or the SCell group;
an indication of dormancy and/or adaptation of the PCell; or
an indication for configuring the SCell dormancy indication information field as default information bits.

9. The method according to claim 8, wherein configuring the indication information for the SCell dormancy indication information field comprises:
assigning a value to a target information field, and configuring the target information field assigned as the indication information, or configuring configuration information of high-layer parameters; configuring the indication information according to the configuration information; and sending the indication information to the terminal with a first high-layer signaling.

10. The method according to claim 9, wherein the target information field at least comprises a carrier indicator field, wherein the indication information is carried in the DCI and sent to the terminal,
wherein if an assignment of the carrier indicator field is zero or the carrier indicator field is zero bit, the SCell dormancy indication information field represents an indication of whether the SCell or a SCell group is dormant;
if the assignment of the carrier indicator field is non-zero, the SCell dormancy indication information field represents one of:
a joint indication of dormancy and/or adaptation of a PCell and dormancy and/or adaptation of the SCell or the SCell group;
an indication of dormancy and/or adaptation of the PCell; or
an indication for configuring the SCell dormancy indication information field as default information bits.

11. The method according to claim 8, wherein configuring the SCell dormancy indication information field in the DCI comprises:
receiving a target parameter sent by the terminal, wherein the target parameter comprises at least one selected from a version parameter of the terminal and a capability parameter of the terminal; and
configuring the SCell dormancy indication information field according to the target parameter.

12. The method according to claim 8, further comprising:
sending a third high-layer signaling to the terminal if the SCell dormancy indication information field represents the indication of the adaptation of the PCell, wherein the third high-layer signaling is configured to instruct the terminal to configure an adaptation behavior of the PCell;
wherein the adaptation behavior of the PCell comprises performing monitoring according to candidate values of one or more parameters in a parameter set configured for PDCCH monitoring, and the candidate values are a subset of values in a value set configured for the one or more parameters, or values different from those in the value set,
or
sending a fourth high-layer signaling to the terminal if the SCell dormancy indication information field represents the indication of the dormancy of the PCell, wherein the fourth high-layer signaling is configured to instruct the terminal to configure a dormancy behavior of the PCell, and the dormancy behavior of the PCell comprises skipping one or more PDCCH monitoring occasions,
or
sending a fifth high-layer signaling to the terminal if the SCell dormancy indication information field represents the indication of the dormancy and the adaptation of the PCell, wherein the fifth high-layer signaling is configured to instruct the terminal to configure a joint monitoring behavior of the PCell comprising a dormancy behavior and an adaptation behavior, and the joint monitoring behavior comprises skipping one or more PDCCH monitoring occasions, and performing adaptation adjustment on one or more parameters in a parameter set configured for the PDCCH monitoring,
or
sending a sixth high-layer signaling to the terminal, wherein the sixth high-layer signaling carries a mapping relationship between the joint indication and monitoring behaviors of the PCell and the SCell or the SCell group, if the SCell dormancy indication information field represents the joint indication of the dormancy and/or the adaptation of the PCell and the dormancy and/or the adaptation of the SCell or the SCell group, and a value corresponding to the SCell dormancy indication information field is determined as the joint indication.

13. A network side device, applied to a scenario where DCI carries scheduling information, and comprising:
a memory;
a transceiver; and
a processor;
wherein the memory is configured to store computer programs; the transceiver is configured to send or receive data under a control of the processor; the processor is configured to read the computer programs in the memory to perform acts of the method according to claim 8.

14. A non-transitory processor-readable storage medium having stored therein computer programs that, when executed by a processor, cause the processor to perform the information transmission method according to claim 8.

15. An information transmission method, applied to a scenario where downlink control information (DCI) carries scheduling information, and comprising:
configuring a secondary cell (SCell) dormancy indication information field in the DCI; and
sending the DCI configured to a terminal, wherein the SCell dormancy indication information field represents an actual indication for monitoring a PDCCH, and the actual indication is determined by the terminal according to indication information,
if the indication information is a first value, determining that the SCell dormancy indication information field represents an indication of whether the SCell or a SCell group is dormant;
if the indication information is a second value, determining that the SCell dormancy indication information field represents one of:
a joint indication of dormancy and/or adaptation of a primary cell (PCell) and dormancy and/or adaptation of the SCell or the SCell group;
an indication of dormancy and/or adaptation of the PCell; or
an indication for configuring the SCell dormancy indication information field as default information bits.

16. The method according to claim 15, wherein configuring the SCell dormancy indication information field in the DCI comprises:
receiving a target parameter sent by the terminal, wherein the target parameter comprises at least one selected from a version parameter of the terminal and a capability parameter of the terminal; and
configuring the SCell dormancy indication information field according to the target parameter.

17. A network side device, applied to a scenario where DCI carries scheduling information, and comprising:
a memory;
a transceiver; and
a processor;
wherein the memory is configured to store computer programs; the transceiver is configured to send and receive data under control of the processor; the processor is configured to read the computer programs in the memory to perform acts of the method according to claim 15.

18. A non-transitory processor-readable storage medium having stored therein computer programs that, when executed by a processor, cause the processor to perform the information transmission method according to claim 15.

* * * * *